(12) United States Patent
Mizukami et al.

(10) Patent No.: US 7,840,290 B2
(45) Date of Patent: Nov. 23, 2010

(54) ENCODED DIGITAL AUDIO REPRODUCING APPARATUS

(75) Inventors: Akifumi Mizukami, Yokohama (JP); Masakazu Fukumoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1295 days.

(21) Appl. No.: 11/348,318

(22) Filed: Feb. 7, 2006

(65) Prior Publication Data

US 2006/0188227 A1    Aug. 24, 2006

(30) Foreign Application Priority Data

Feb. 9, 2005    (JP)    ............... 2005-033118

(51) Int. Cl.
*G06F 17/00*    (2006.01)
*G06F 3/00*    (2006.01)
(52) U.S. Cl. .......................... 700/94; 710/52
(58) Field of Classification Search .................. 700/94; 704/500; 707/3, 4, 7, 999.003, 999.004, 707/999.007; 360/72.2; 365/231; 369/27.01, 369/30.01, 47.47, 47.54; 711/221; 710/52, 710/58

See application file for complete search history.

(56) References Cited

U.S. PATENT DOCUMENTS

| 5,828,370 | A | * | 10/1998 | Moeller et al. ............... 715/720 |
| 6,262,776 | B1 | * | 7/2001 | Griffits ........................ 348/512 |
| 6,658,200 | B2 | * | 12/2003 | Ando et al. .................... 386/95 |
| 6,721,490 | B1 | * | 4/2004 | Yao et al. ....................... 386/69 |
| 6,965,724 | B1 | * | 11/2005 | Boccon-Gibod et al. ...... 386/68 |
| 2004/0146285 | A1 | | 7/2004 | Matsui et al. |
| 2004/0249489 | A1 | * | 12/2004 | Dick ........................... 700/94 |
| 2005/0069282 | A1 | | 3/2005 | Tanabe et al. |

FOREIGN PATENT DOCUMENTS

| JP | 2001-309301 | 11/2001 |
| JP | 2003-289495 | 10/2003 |

* cited by examiner

*Primary Examiner*—Vivian Chin
*Assistant Examiner*—Daniel R Sellers
(74) *Attorney, Agent, or Firm*—Oblon, Spivak, McClelland, Maier & Neustadt, L.L.P.

(57) ABSTRACT

There is provided with an encoded digital audio reproducing apparatus including: a reading control portion which reads an encoded audio file having a data part including audio data as a sequence of frames and a size part including size information on each of the frames; a table generating portion which generates a table holding positional information on frames at intervals of a predetermined number of frames in the sequence of frames; a decoding portion which sequentially decodes the audio data from a leading frame to output the decoded audio data; a reproducing portion which reproduces the decoded audio data; and a reproduction start position calculating portion which, in the case where a reproduction request from an arbitrary frame in the audio data is inputted, decides from the table a frame satisfying a positional reference for the arbitrary frame as a reproduction start frame.

5 Claims, 25 Drawing Sheets

ENCODED DIGITAL AUDIO REPRODUCING APPARATUS

CROSS-REFERENCE TO RELATED APPLICATIONS

This application claims the benefit of priority under 35USC §119 to Japanese Patent Application No. 2005-33118 filed on Feb. 9, 2005, the entire contents of which are incorporated herein by reference.

BACKGROUND OF THE INVENTION

1. Field of the Invention

The present invention relates to an encoded digital audio reproducing apparatus for performing reproduction and fast-forwarding/rewinding reproduction or the like in the middle of an encoded audio file.

2. Related Art

In the case of an MP4 file which is one of the formats of an encoded audio file, frame size information on each individual frame configuring encoded audio data is stored in a place (a sample size box of a header portion) different from the encoded audio data itself.

In the case where a read error or the like occurs in such an encoded audio file due to a flaw on a recording medium or the like while reading the encoded audio data, or in the case where fast-forwarding/rewinding reproduction is performed, the encoded audio data is reproduced in the middle. Concretely, whenever reproduction due to an error is performed or in fast-forwarding/rewinding reproduction, next reproduction position is to be calculated, reproduction is performed by reading the frame size information from the recording medium, calculating a frame position for starting the reproduction and reading the encoded audio data from that position.

In the case where the encoded audio file is recorded on a recording medium of a low reading speed (such as a CD), however, it is not desirable to read the frame size information each time the encoded audio data is reproduced in the middle from the viewpoint of processing efficiency.

Therefore, under normal circumstances, a frame position information table having the frame position information on each frame contained in the encoded audio data is generated and stored, based on the frame size information at a time of initial reproduction so as to realize the reproduction of the encoded audio data in the middle at high speed.

However, the number of frames of the encoded audio data is proportional to a sample rate and a tune length so that there are a number of frames in the case of a long-time tune of a high sample rate. Therefore, a large memory area must be secured in order to hold the frame size information on each frame.

SUMMARY OF THE INVENTION

According to an aspect of the present invention, there is provided with an encoded digital audio reproducing apparatus comprising: a reading control portion which reads from a recording medium an encoded audio file having a data part including audio data as a sequence of frames and a size part including size information on each of the frames; a table generating portion which receives the size information on the frames from the reading control portion and generates a table holding positional information on frames at intervals of a predetermined number of frames in the sequence of frames based on the size information on the frames in the sequence of frames; a decoding portion which receives the audio data from the reading control portion and sequentially decodes the audio data from a leading frame to output the decoded audio data; a reproducing portion which reproduces the decoded audio data; and a reproduction start position calculating portion which, in the case where a reproduction request from an arbitrary frame in the audio data is inputted, decides from the table a frame satisfying a positional reference for the arbitrary frame as a reproduction start frame, wherein the decoding portion requests the reading control portion to read frames from the reproduction start frame from the recording medium.

According to an aspect of the present invention, there is provided with an encoded digital audio reproducing apparatus comprising: a reading control portion which reads from a recording medium an encoded audio file having a data part including audio data as a sequence of frames and a size part including size information on each of the frames; a table generating portion which receives the size information on each of the frames, or a size of the audio data and a number of the frames, from the reading control portion, calculates an average frame size, calculates a difference size between the size of each of the frames and the average frame size, and generates a table holding the difference size calculated as to each of the frames; a decoding portion which receives the audio data from the reading control portion and sequentially decodes the audio data from a leading frame to output the decoded audio data; a reproducing portion which reproduces the decoded audio data; and a reproduction start position calculating portion which, in the case where a reproduction request from an arbitrary frame in the audio data is inputted, reads from the table the difference size of each of frames from the leading frame in the audio data to the frame immediately preceding the arbitrary frame, totals the read difference sizes, multiplies the average frame size by the number of frames whose difference sizes are read, and adds a total of the difference sizes to a result of the multiplication so as to decide a reproduction start frame for starting reproduction, wherein the decoding portion requests the reading control portion to read frames from the reproduction start frame from the recording medium.

According to an aspect of the present invention, there is provided with an encoded digital audio reproducing apparatus comprising: a reading control portion which reads from a recording medium an encoded audio file having a data part including audio data as a sequence of frames and a size part including size information on each of the frames; a table generating portion which receives the size information on each of the frames, or a size of the audio data and a number of the frames, from the reading control portion, calculates an average frame size, calculates as to each of the frames an offset size that is a total size from a leading frame to a immediately preceding frame, calculates as to each of the frames a difference size between a result of multiplying the number of frames from the leading frame to the immediately preceding frame by the average frame size and the offset size corresponding the frame, and generates a table holding the difference size calculated as to each of the frames; a decoding portion which receives the audio data from the reading control portion and sequentially decodes the audio data from the leading frame to output the decoded audio data; a reproducing portion which reproduces the decoded audio data; and a reproduction start position calculating portion which, in the case where a reproduction request from an arbitrary frame in the audio data is inputted, detects the difference size corresponding to the arbitrary frame from the table, and totals a result of multiplying the number of frames from the leading frame to a frame immediately preceding the arbitrary frame by the average frame size and the detected difference size so as to decide a reproduction start frame for starting reproduction, wherein the decoding portion requests the reading control portion to read frames from the reproduction start frame from the recording medium.

DETAILED DESCRIPTION OF THE INVENTION

First Embodiment

Figure 1:
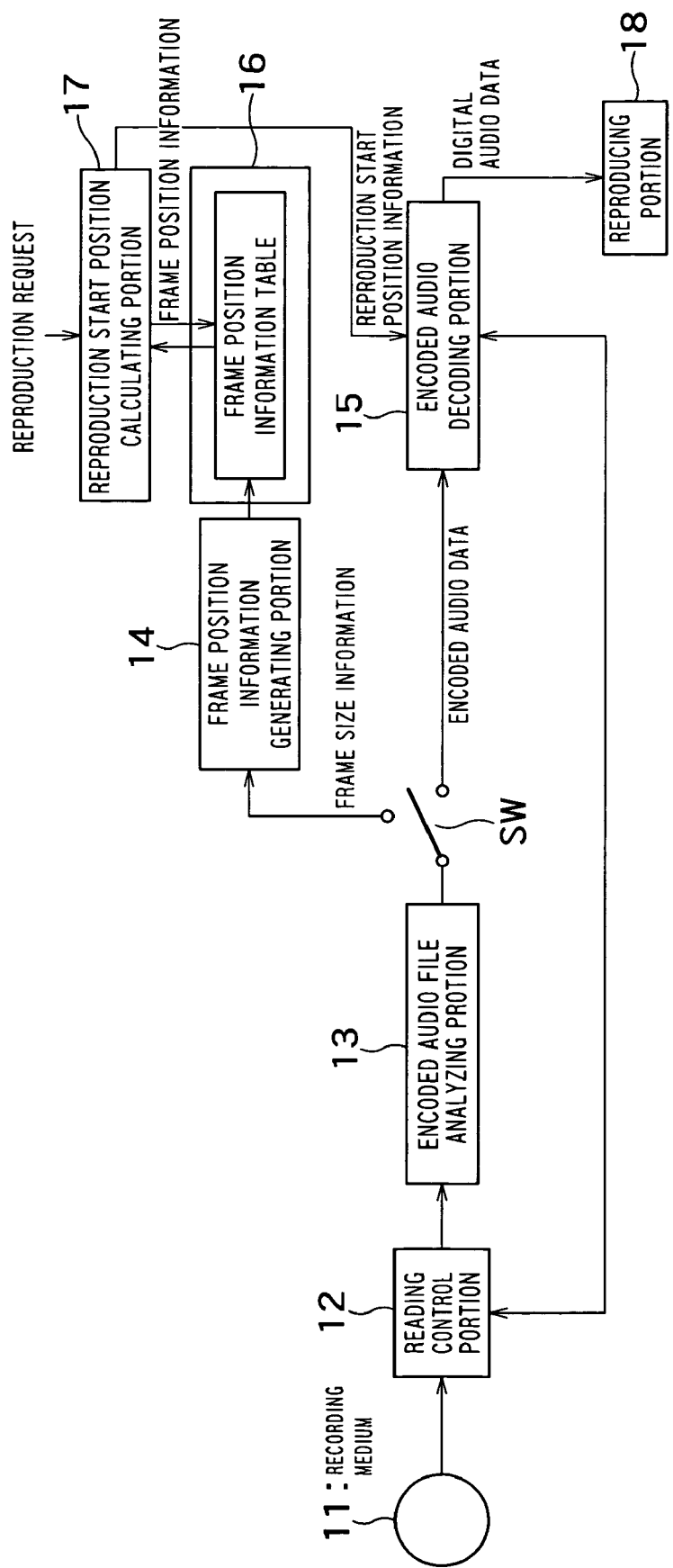
FIG. 1 is a block diagram schematically showing a configuration of an encoded digital audio reproducing apparatus according to a first embodiment of the present invention.

FIG. 1 is a block diagram schematically showing a configuration of an encoded digital audio reproducing apparatus according to a first embodiment of the present invention.

The encoded digital audio reproducing apparatus includes a recording medium 11, a reading control portion 12, an encoded audio file analyzing portion 13, a frame position information generating portion 14, an encoded audio decoding portion 15, a memory unit 16, a reproduction start position calculating portion 17 and a reproducing portion 18. Of these, functions of all or a part of the reading control portion 12, encoded audio file analyzing portion 13, frame position information generating portion 14, encoded audio decoding portion 15, reproduction start position calculating portion 17 and reproducing portion 18 may be either realized by making a program generated based on an ordinary programming technique executed by a computer such as a CPU or realized hardware-wise.

The recording medium 11 has an encoded audio file.

Figure 2:
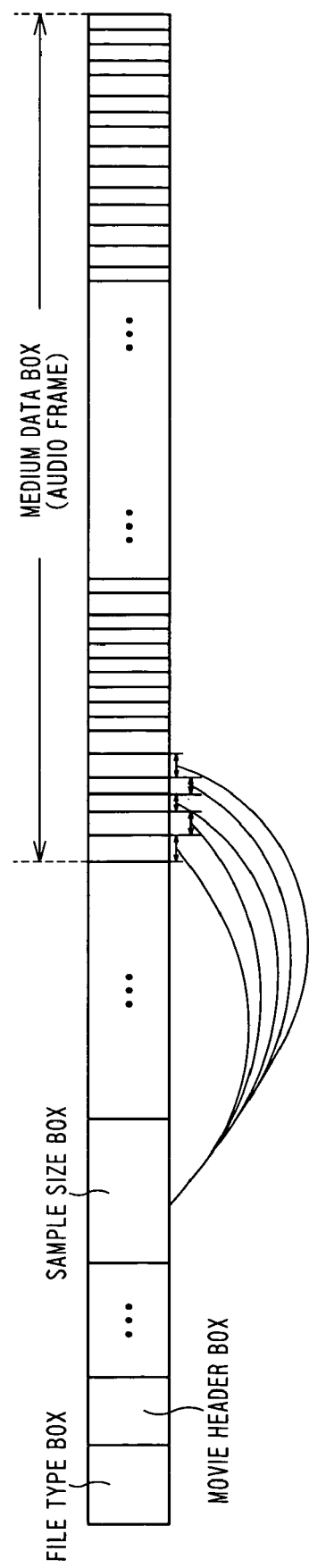
FIG. 2 is a diagram schematically showing a format of an MP4 file compliant with MPEG4 AAC.

FIG. 2 is a diagram schematically showing a format of an MP4 file compliant with MPEG4 AAC as an example of the encoded audio file.

The encoded audio file has frame size information on each individual frame configuring the encoded audio data stored in a place (a sample size box of a header portion) different from the encoded audio data itself. Each frame (a sequence of frames) configuring the encoded audio data is stored in a medium data box (data part). Reproduction time corresponding to each frame is the same.

The reading control portion 12 reads the encoded audio file from the recording medium 11 and passes it to the encoded audio file analyzing portion 13.

The encoded audio file analyzing portion 13 analyzes a received encoded audio file and extracts the frame size information on each individual frame and the encoded audio data from the encoded audio file respectively. A switch SW is connected to an output side of the encoded audio file analyzing portion 13. The switch SW can switch between the frame position information generating portion 14 and the encoded audio decoding portion 15. There may be a buffer provided between the switch SW and the encoded audio decoding portion 15.

The frame position information generating portion 14 generates a frame position information table having the position information (addresses on the recording medium 11 for instance) of frames at intervals of a predetermined number of frames from the frame size information on each of the frames. The frame position information generating portion 14 is one form of a table generating portion. It is also possible to have a frame identifier for each piece of the frame position information held in the table. The generated frame position information table is stored in the memory unit 16.

Figure 3:
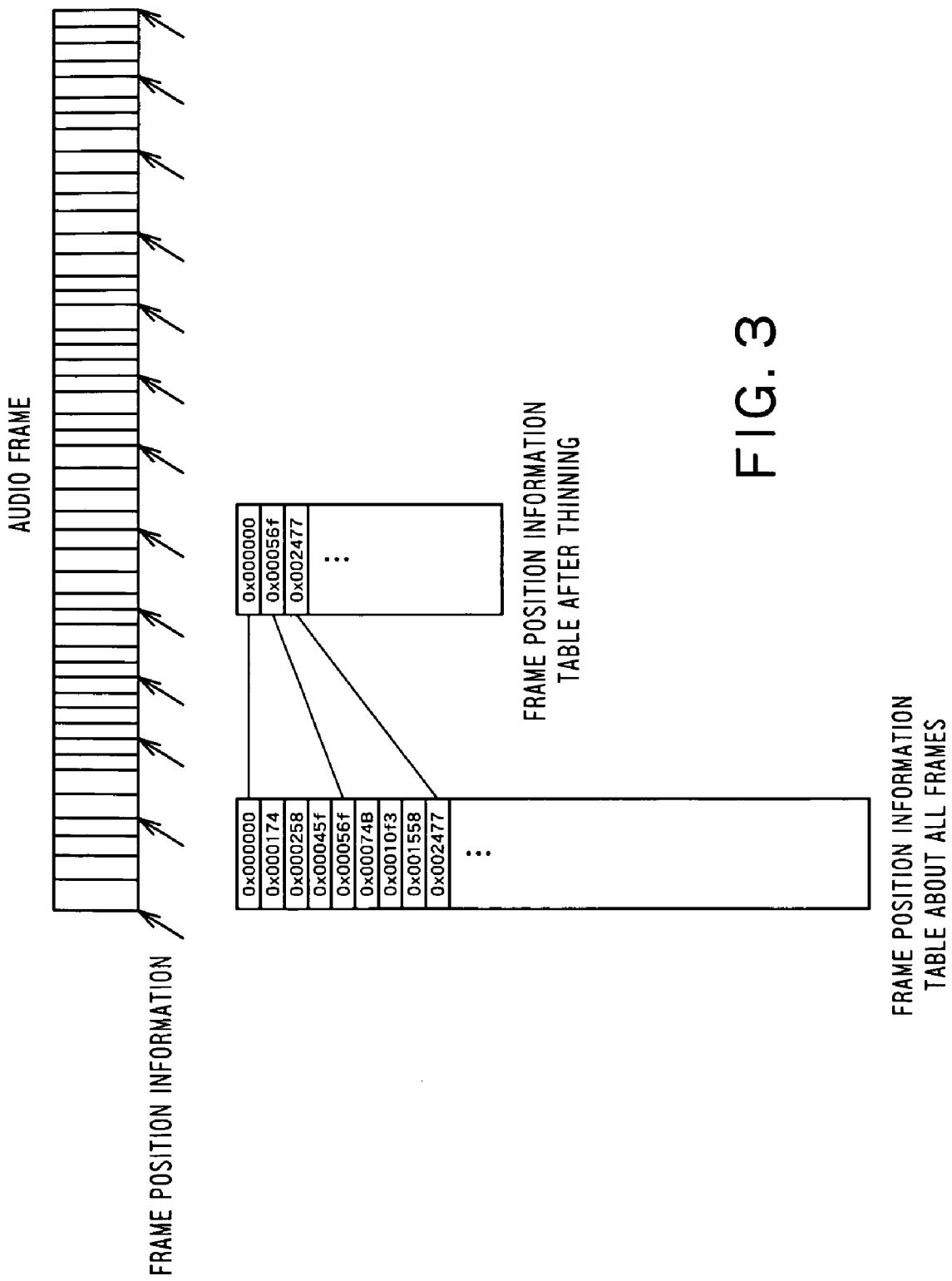
FIG. 3 is a diagram showing an example of extracting frame position information at intervals of three frames.

In more detail, a table storing the frame position information on all the frames (intermediate table) is generated, and the frame position information is selected from the generated intermediate table at predetermined intervals so as to generate the frame position information table. FIG. 3 shows an example of the generation of the frame position information table. The frame position information table is generated by extracting the frame position information at intervals of three frames from a leading frame in the intermediate table storing the frame position information on all the frames. The frame position information table may be directly generated without generating the intermediate table.

In FIG. 1, the encoded audio decoding portion 15 receives the encoded audio data from a leading frame from the encoded audio file analyzing portion 13 and decodes it after or during the generation of the frame position information table so as to output digital audio data (decoded audio data), such as PCM data. The encoded audio file analyzing portion 13 passes the frame in timing of an instruction from the encoded audio decoding portion 15.

The reproducing portion 18 performs a reproduction process by using the digital audio data outputted from the encoded audio decoding portion 15.

Figure 4:
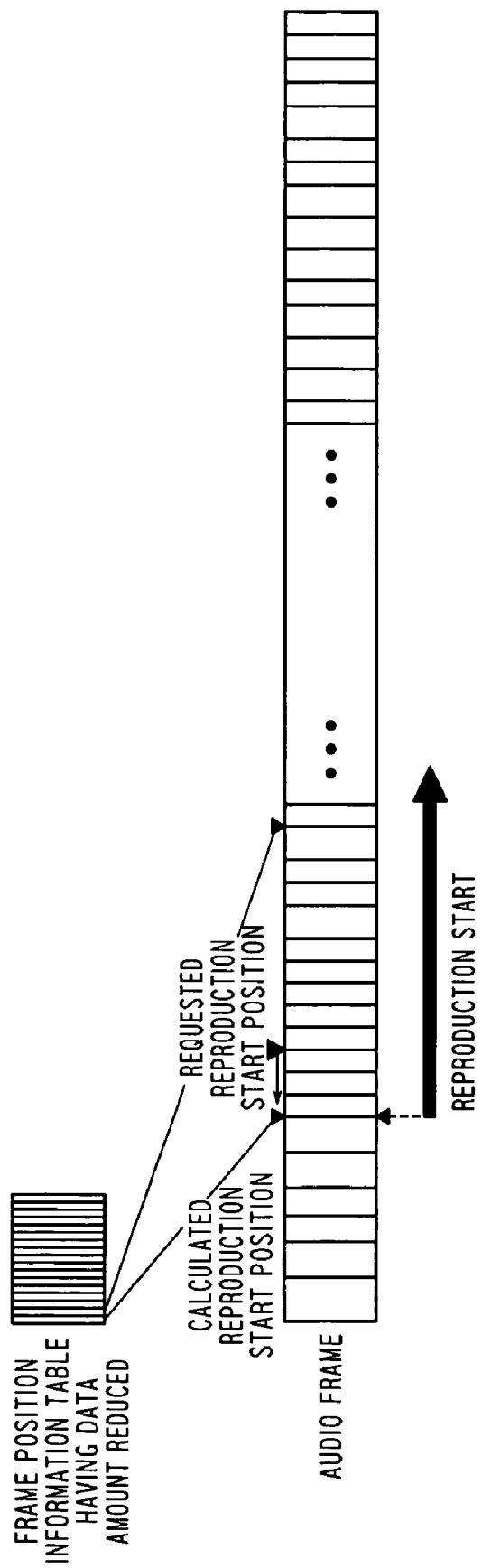
FIG. 4 is a diagram showing an example of deciding a reproduction start frame.

To the reproduction start position calculating portion 17, a reproduction request from a first or halfway frame (reproduction start request frame) is inputted due to a reading error from the recording medium 11 or a user input. If the reproduction request is inputted, the reproduction start position calculating portion 17 refers to the frame position information table in the memory unit 16 and decides the frame closest to the reproduction start request frame in the frame position information table as a reproduction start frame. FIG. 4 shows a picture of this. In the example of FIG. 4, a frame preceding the reproduction start request frame time-wise is decided as the reproduction start frame.

In the case where the reproduction request requests that the frame preceding or following the reproduction start request frame time-wise be rendered as the reproduction start frame, it is possible to decide the frame preceding or following the reproduction start request frame time-wise as the reproduction start frame.

The reproduction start position calculating portion 17 outputs reproduction start position information indicating the position (address) of the decided reproduction start frame to the encoded audio decoding portion 15.

The encoded audio decoding portion 15 requests the reading control portion 12 to read the encoded audio data from the position (frame) indicated in the inputted reproduction start position information.

The reading control portion 12 reads the encoded audio data from the requested reproduction start frame from the recording medium 11 and passes it to the encoded audio decoding portion 15 directly or via the encoded audio file analyzing portion 13.

The encoded audio decoding portion 15 starts decoding the received encoded audio data, that is, the encoded audio data from the reproduction start request frame or a frame in proximity thereto so as to output the digital audio data.

As described above, it is possible, according to this embodiment, to reproduce the encoded audio data from an almost arbitrary position (frame) with the memory unit of a small capacity, that is, the frame position information table of a small size.

Figure 5:
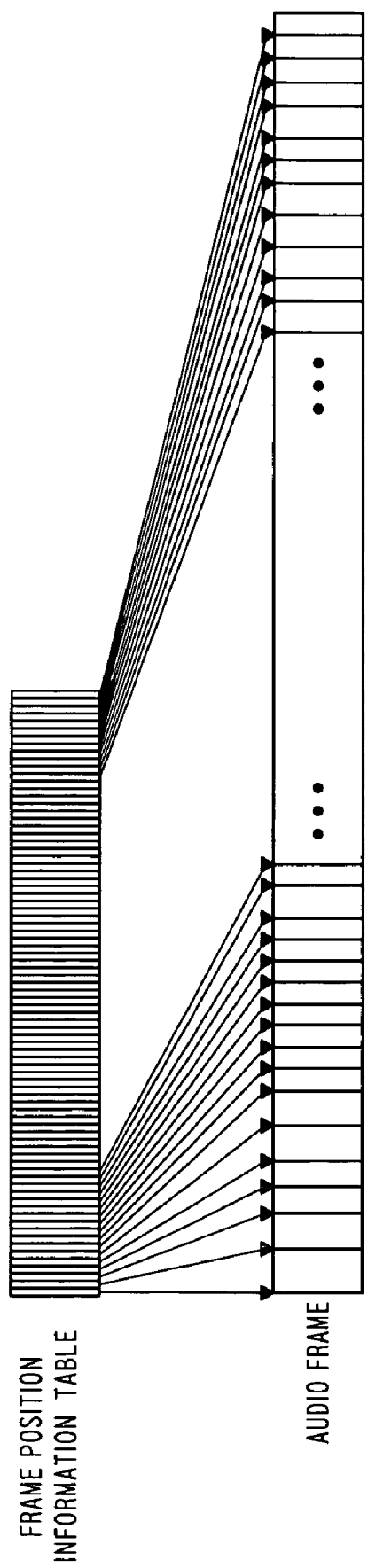
FIG. 5 is a diagram for describing a conventional frame position information table.

To be more specific, as shown in FIG. 5, positional information on all the frames was conventionally stored in the frame position information table. Therefore, there was a problem that the frame position information table becomes large especially in the case where a tune length is long.

In comparison, it is possible, according to this embodiment, to hold the frame position information at intervals of a predetermined number of frames and on reproduction, start reproducing from the frame closest to the reproduction start request frame so as to reduce a necessary data amount.

In the above description, as shown in FIG. 3, the frame position information table is generated by extracting the frame position information at intervals of a predetermined number of frames from the frame position information on all the frames. If the frame position information table is thus created by evenly thinning the frame position information, however, there occurs a problem, in the case where there are a large number of frames in the encoded audio data (in the case of a long tune), that the intervals of the frame position information stored in the frame position information table become too large.

As a concrete example, consideration is given to the case of generating the frame position information table for the encoded audio data of which sample rate is 44.1 kHz and tune length is 3 minutes.

A memory area of 1024 bytes is assigned for the generation of the frame position information table. The frame position information table stores the frame position information at data width of 4 bytes per frame. In this case, the memory area can hold 1024/4=256 pieces of table data (frame position information).

If the number of PCM data samples to be decoded from one frame of the encoded audio data is 1024 in the above case, the interval between table items is 3×60×44100/1024/256≈9 frames. This interval is 0.2 seconds or so in actual time.

Next, consideration is given to the case of generating the frame position information table for the encoded audio data of which sample rate is the same and tune length is 60 minutes. In this case, the frame position information can only be held at intervals of 60×60×44100/1024/256≈604 frames. This is equivalent to 14 seconds in actual time. Therefore, in the case of performing fast-forwarding reproduction or rewinding reproduction, the reproduction can only be performed at intervals of at least 14 seconds so that skipping width becomes too large.

In consideration of the above points, this embodiment uses not only audio data size, total number of frames and the frame size information on each of the frames but also supplementary information (tune information) on the audio data such as length of silent section, a break of a tune and a refrain start position or the like so as to generate an effective frame position information table. The supplementary information may also describe characteristics of frame sections (such as the silent section, refrain start section and refrain section or the like) included in the audio data.

Figure 6:
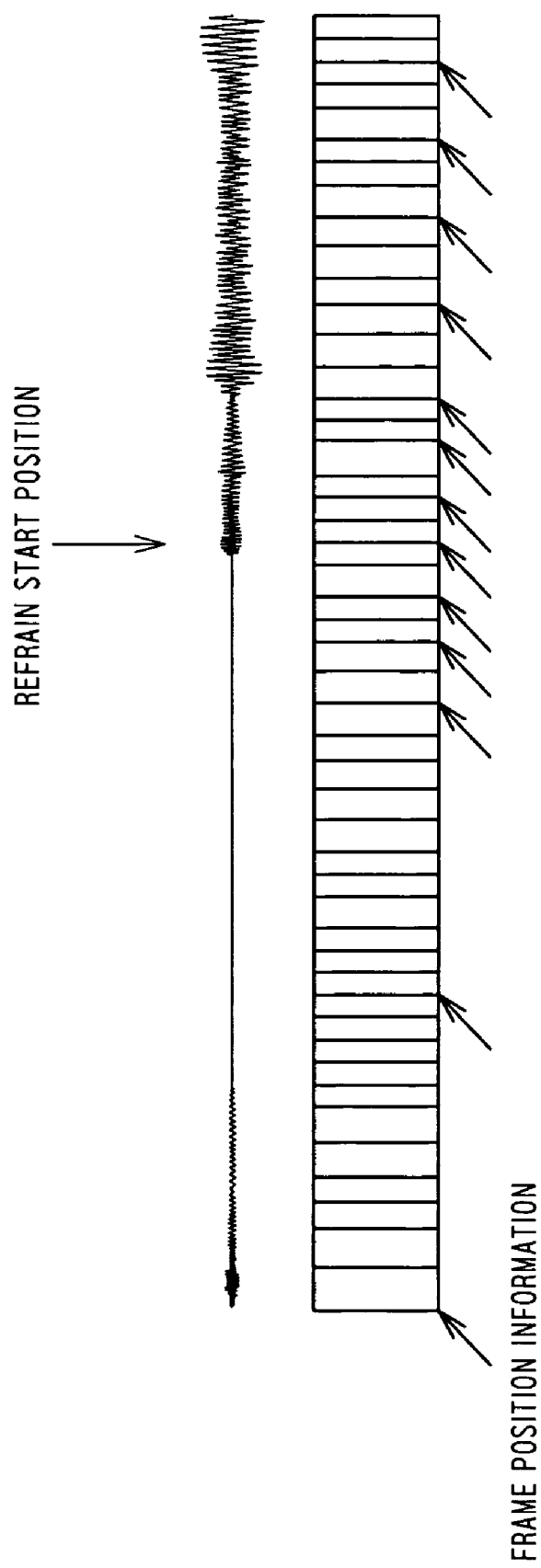
FIG. 6 is a diagram showing an example of adjusting the intervals of frame position information based on tune information.

The supplementary information on the audio data is prepared on the encoding side, or the tune is once decoded on the decoding side so as to obtain the information on the silent section, sound start sections and so on as the tune information. The frame position information generating portion 14 (refer to FIG. 1) uses this tune information to extend the intervals of the frame position information at a break of a tune and around a silent section and narrow them at a refrain section. In the example shown in FIG. 6, the intervals of the frame position information are wide in the silent and nearly silent section, are narrow around refrain start section and are set midway between them in refrain middle section. The intervals of the frame position information may be either decided in advance according to the contents of the tune information (such as whether or not the silent section, whether or not a refrain start section and whether or not a refrain middle section) or decided dynamically according to the length of the silent section, the length of the refrain start section and the length of the refrain middle section. The number of pieces of the frame position information that can be held is predetermined.

As described above, it is possible to reflect the supplementary information on the audio data on the generation of the frame position information table so as to skip the silent section and perform the fast-forwarding reproduction and rewinding reproduction at smaller intervals around the refrain section.

According to the above description, the intervals of the frame position information are decided based on the tune information. It is also possible, however, to decide the intervals of the frame position information based on a user specification.

Figure 7:
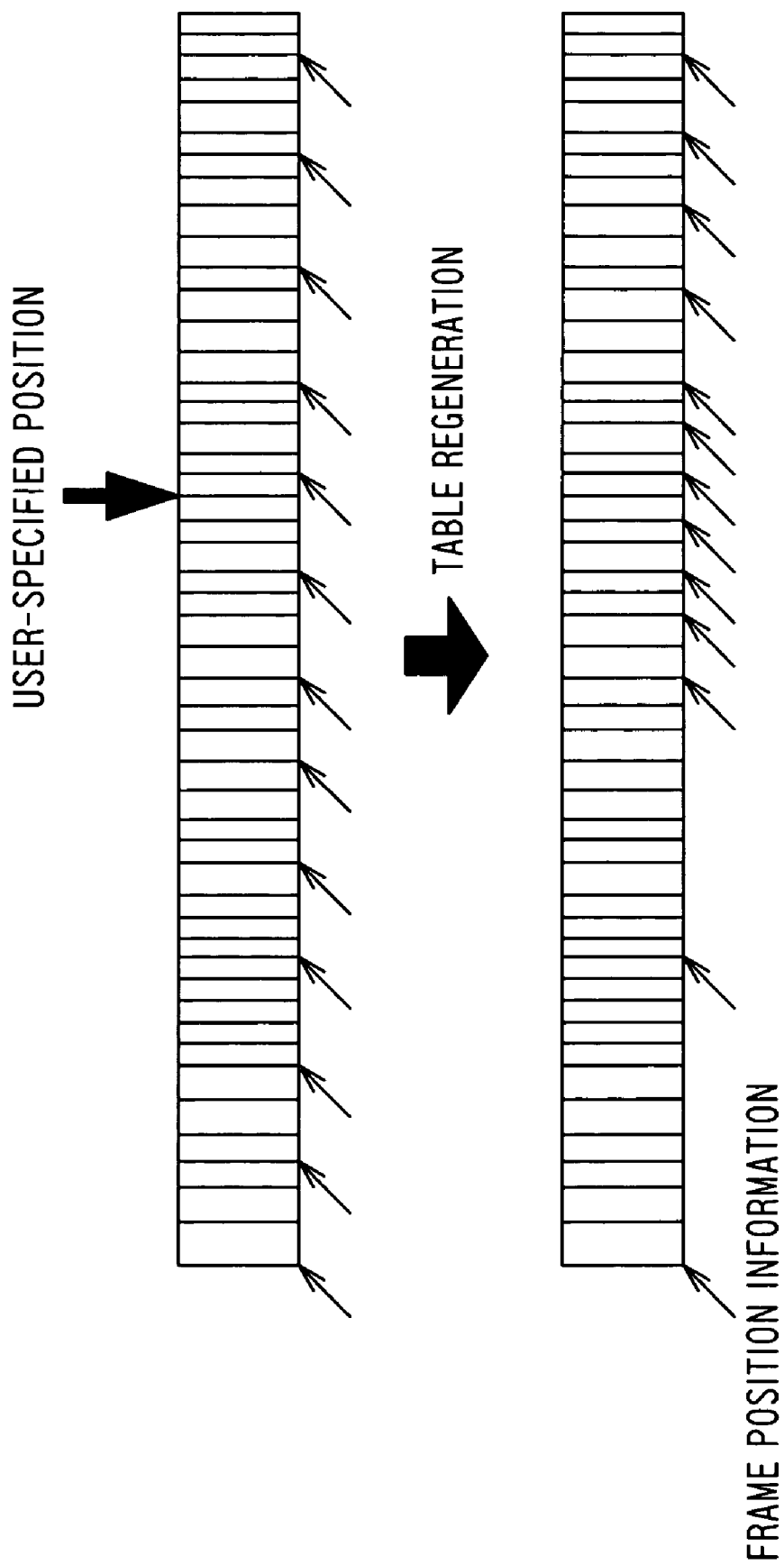
FIG. 7 is a diagram showing an example of adjusting the intervals of the frame position information based on a user specification.

To describe it in detail, the frame position information table having the frame position information evenly thinned is generated to start decoding and reproducing the encoded audio data. On reproduction, if the position (frame) to be reproduced is specified by the user as shown in FIG. 7, the frame position information generating portion 14 stores the specified position. On reproduction of the encoded audio data next time, the frame position information generating portion 14 generates the frame position information table having the frame position information around the specified position (such as a frame group in a predetermined range for the specified frame) rendered at smaller intervals before decoding, and updates a previous frame position information table with this table. It is thereby possible to adjust the intervals of the frame position information so as to meet the user's request.

Furthermore, it is also possible to adjust the intervals of the frame position information as follows.

Figure 8:
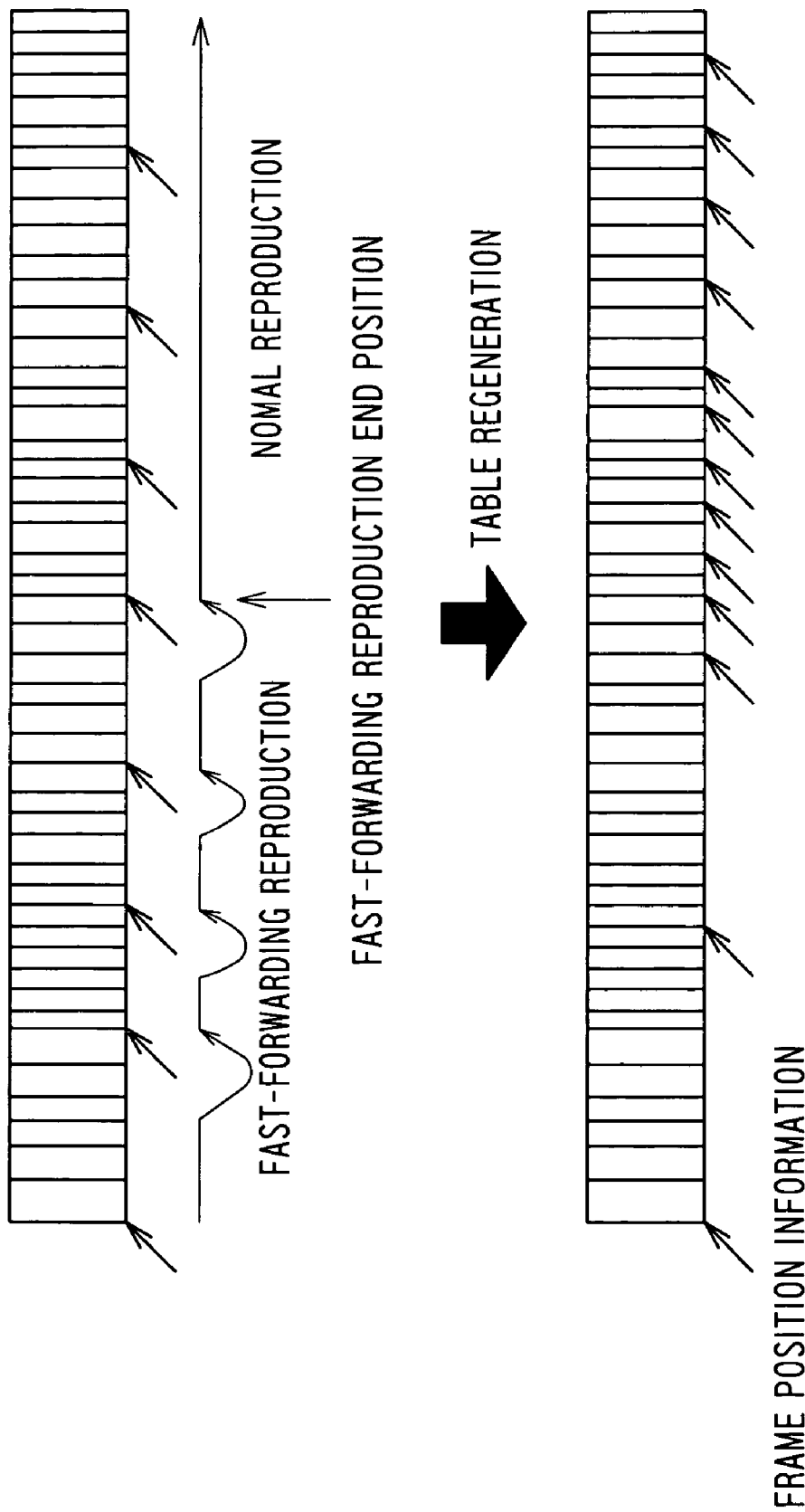
FIG. 8 is a diagram showing an example of adjusting the intervals of the frame position information based on a position at which normal reproduction is started.

First, the frame position information table having the frame position information evenly thinned is generated, and then the fast-forwarding reproduction of the encoded audio data is started from the leading frame, for instance, based on the user input or the like. If the fast-forwarding reproduction is canceled in the middle thereof by the user input or the like as shown in FIG. 8, the frame position information generating portion 14 stores the position (frame) at which normal reproduction is started. On reproduction of the encoded audio data next time, the frame position information generating portion 14 generates the frame position information table having the frame position information around the position at which the normal reproduction is started (such as a frame group in a predetermined range for the frame at which the normal reproduction is started) rendered at smaller intervals before decoding, and updates a previous frame position information table with this table. It is thereby possible to adjust the intervals of the frame position information so as to meet the user's request.

According to the above description, the decoding and reproduction are started from a reproduction start frame in the case where a reproduction request is inputted. It is also possible, however, to arrange as follows instead.

Figure 9:
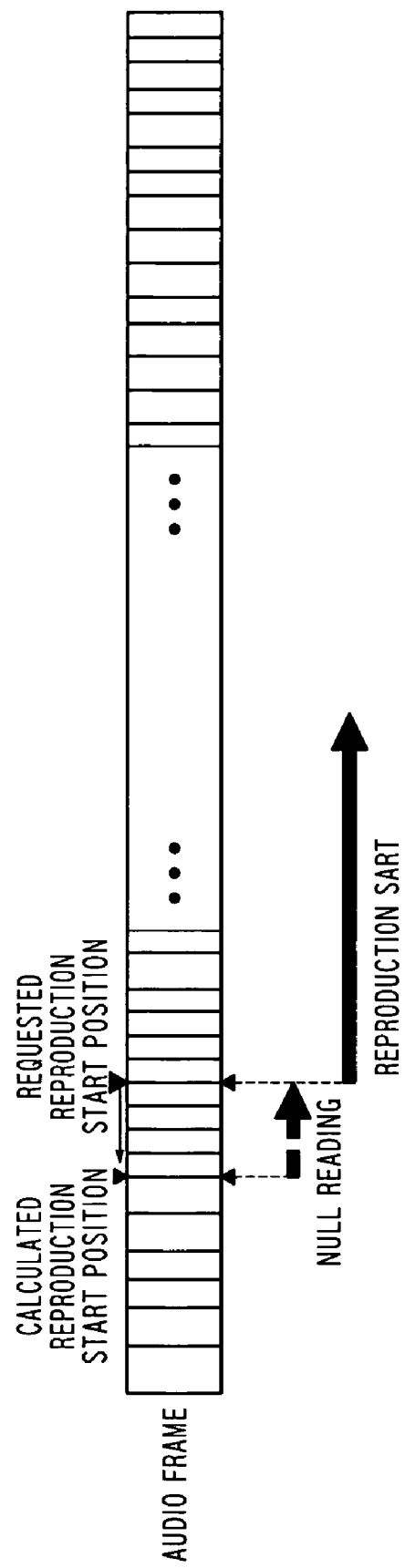
FIG. 9 is a diagram showing an example of performing reproduction after reading up to a frame immediately preceding a reproduction start request frame as null.

To be more specific, in the case where the reproduction request is inputted, the reproduction start position calculating portion 17 decides the frame immediately preceding the reproduction start request frame in the frame position information table as the reproduction start frame. The encoded audio decoding portion 15 null-reads the encoded audio data (frames) from the decided reproduction start frame to just before the reproduction start request frame, and starts the decoding from the reproduction start request frame. The reproducing portion 18 reproduces the audio data from the reproduction start request frame onward. FIG. 9 shows a picture of this. Thus, secure reproduction from the reproduction start request frame becomes possible. Here, although the encoded audio decoding portion 15 null-reads the frames from the reproduction start frame to just before the reproduction start request frame, it may also decode the frames. In this case, the reproducing portion 18 reproduces only the part from the reproduction start request frame onward out of the data decoded by the encoded audio decoding portion 15.

The above description indicated the case of performing the normal reproduction from the first or halfway frame based on the frame position information table. In the case of performing the fast-forwarding reproduction or rewinding reproduction, it could be arranged as follows.

Figure 10:
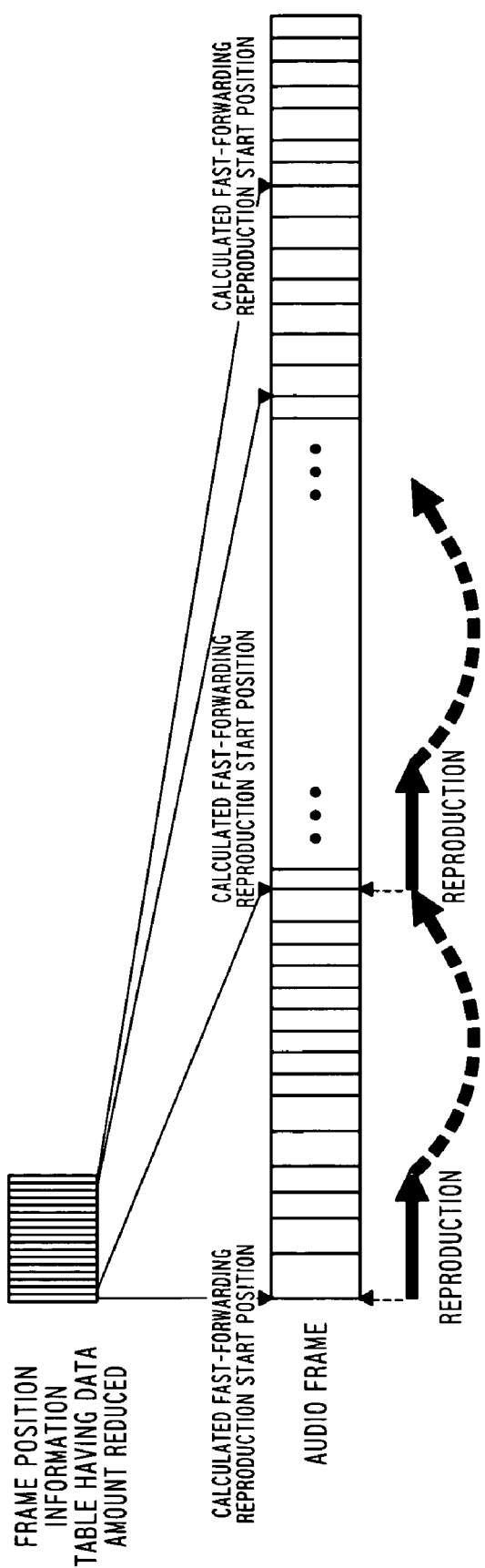
FIG. 10 is a diagram showing an example of performing fast-forwarding reproduction.

In the case where the fast-forwarding reproduction or rewinding reproduction request is inputted, the reproduction start position calculating portion 17 calculates discrete reproduction start positions on the fast-forwarding reproduction or rewinding reproduction from the frame position information table based on the fast-forwarding or rewinding start request position included in the request and the frame position information table. To be more precise, it calculates the skipping width by using a magnification and a reproduction amount provided in advance, and obtains the discrete reproduction start positions from the frame position information table based on the reproduction amount and the calculated skipping width (refer to FIG. 15 mentioned later). The encoded audio decoding portion 15 sequentially performs the decoding from each of the calculated reproduction start positions from the leading side according to the above magnification. In other words, the reproducing portion 18 performs the reproduction from each of the reproduction start positions according to the magnification. FIG. 10 shows a picture of the above.

Here, the fast-forwarding reproduction or rewinding reproduction is performed from each of the reproduction start positions calculated from the frame position information table. It is also possible, however, to start the fast-forwarding reproduction or rewinding reproduction from the reproduction start request position. This will be described hereunder by exemplifying the case of the fast-forwarding reproduction.

Figure 11:
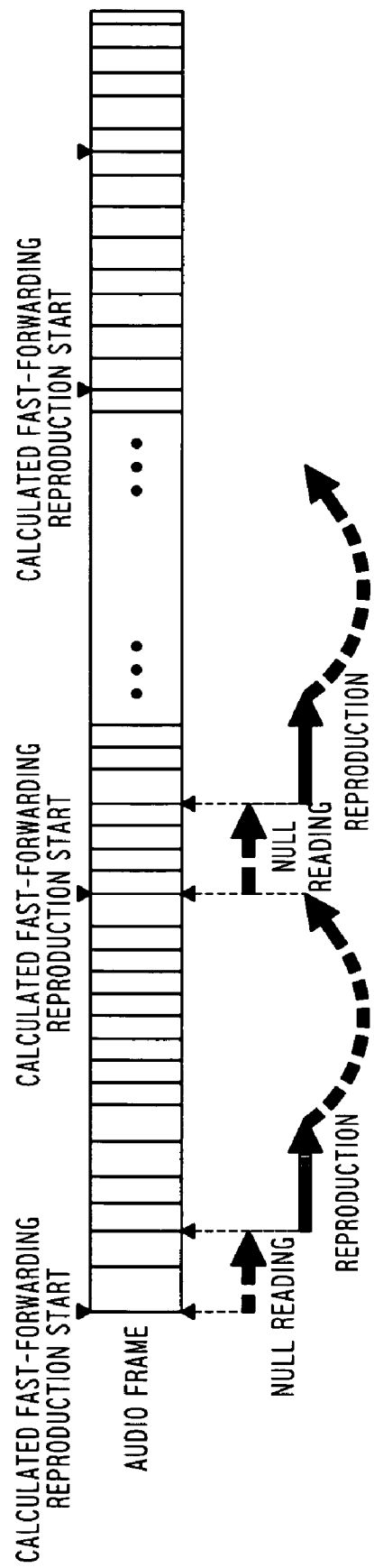
FIG. 11 is a diagram showing another example of performing the fast-forwarding reproduction.

First, the reproduction start position calculating portion 17 calculates the discrete reproduction start positions (i.e. discrete reproduction start frames) by referring to the frame position information table as in the above description. Of the reproduction start positions, the encoded audio decoding portion 15 null-reads the frames from the leading reproduction start position (preceding the start request position by user) to the position before the start request position (frames of null reading amount) so as to start the decoding from the start request position according to the reproduction amount. Thereafter, the encoded audio decoding portion 15 repeatedly null-reads the frames of null reading amount from each of the reproduction start positions and decodes the frames of the reproduction amount. FIG. 11 shows a picture of this.

Second Embodiment

Figure 12:
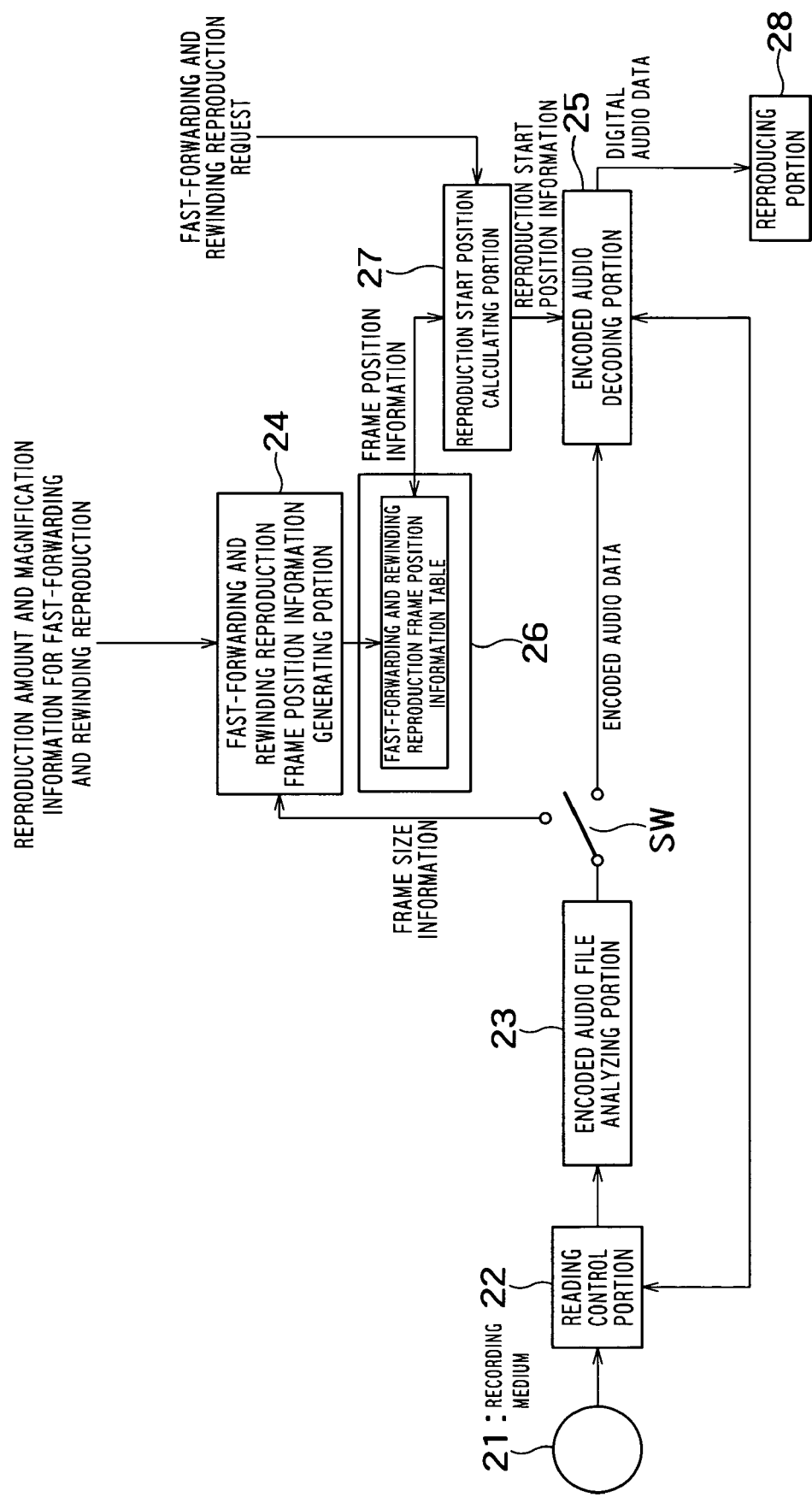
FIG. 12 is a block diagram schematically showing the configuration of the encoded digital audio reproducing apparatus according to a second embodiment of the present invention.

FIG. 12 is a block diagram schematically showing the configuration of the encoded digital audio reproducing apparatus according to a second embodiment of the present invention.

Figure 13:
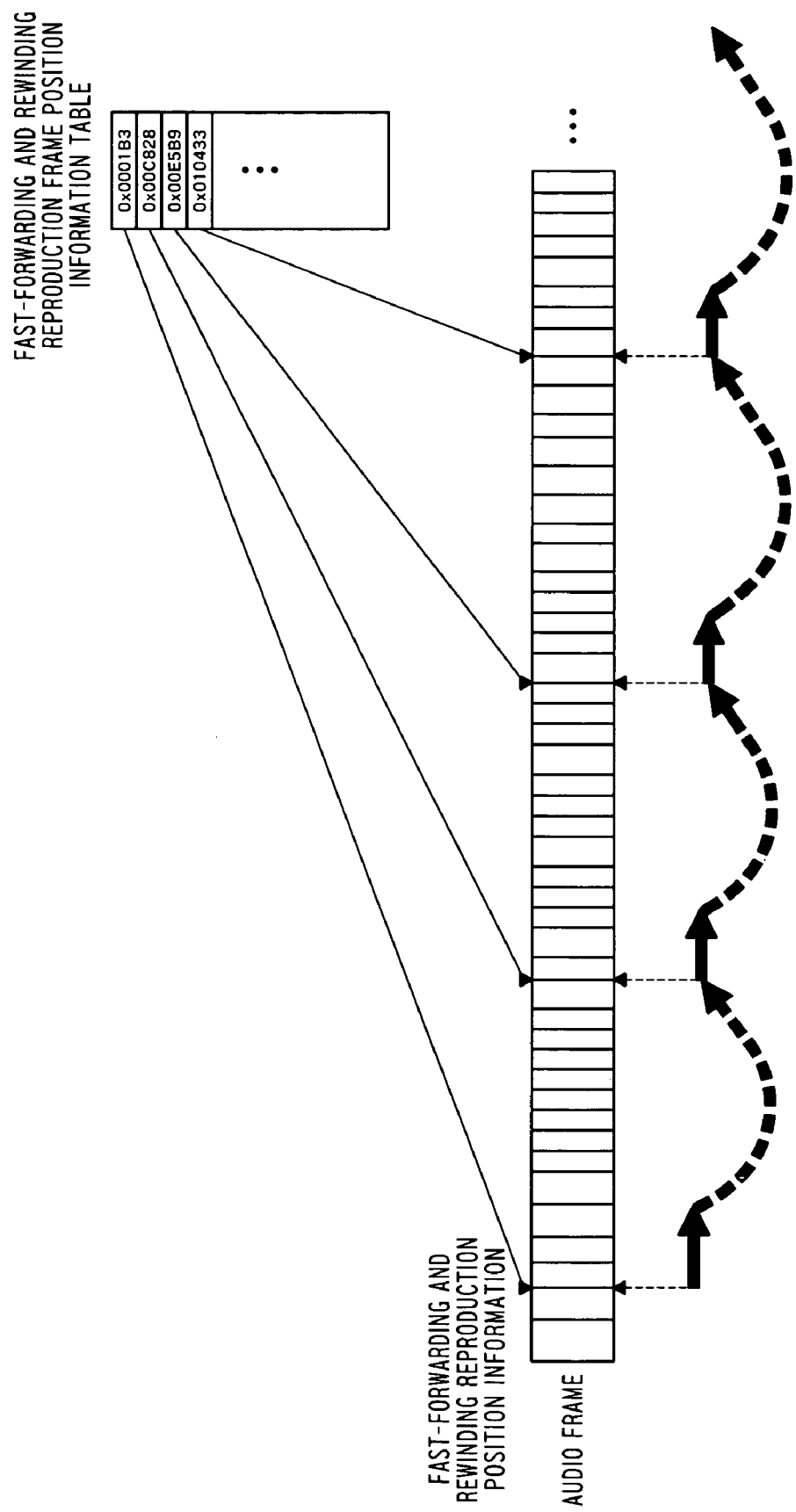
FIG. 13 is a diagram for describing the fast-forwarding reproduction.
Figure 14:
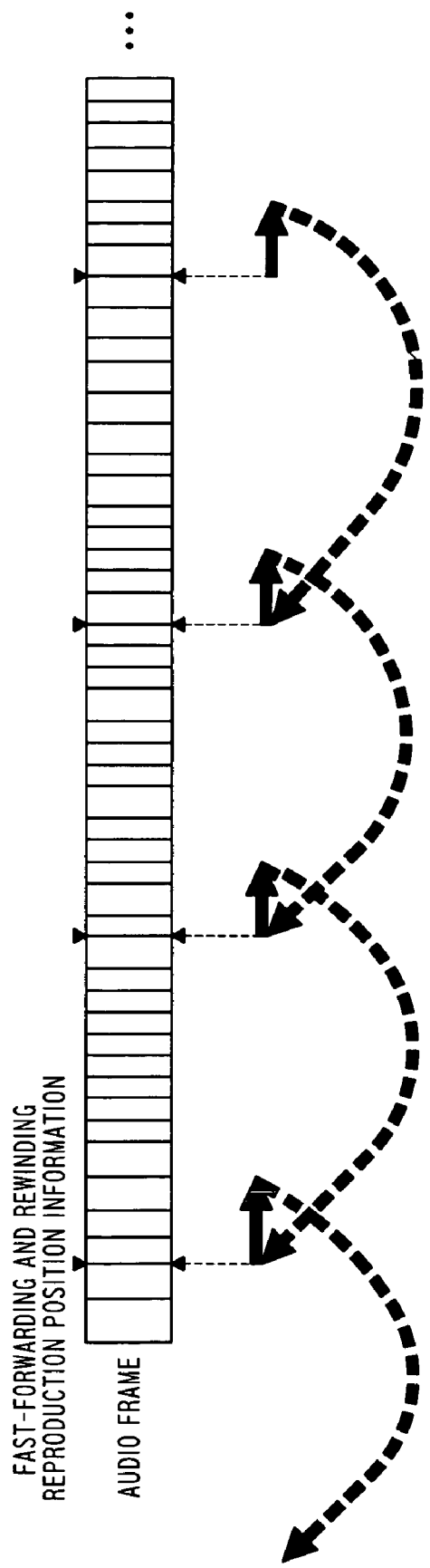
FIG. 14 is a diagram for describing rewinding reproduction.

The encoded digital audio reproducing apparatus performs the fast-forwarding and rewinding reproduction for discretely repeating a fixed amount of reproduction at fixed intervals. FIG. 13 shows a picture of performing the fast-forwarding reproduction. FIG. 14 shows a picture of performing the rewinding reproduction.

The reproducing apparatus includes a recording medium 21, a reading control portion 22, an encoded audio file analyzing portion 23, a fast-forwarding and rewinding reproduction frame position information generating portion 24, an encoded audio decoding portion 25, a memory unit 26, a reproduction start position calculating portion 27 and a reproducing portion 28. Of these, the functions of all or a part of the reading control portion 22, encoded audio file analyzing portion 23, fast-forwarding and rewinding reproduction frame position information generating portion 24, encoded audio decoding portion 25, reproduction start position calculating portion 27 and reproducing portion 28 may be either realized by having a program generated using an ordinary programming technique executed by a computer such as a CPU or realized hardware-wise.

The reading control portion 22 reads the encoded audio file from the recording medium 21 and passes it to the encoded audio file analyzing portion 23.

The encoded audio file analyzing portion 23 analyzes a received encoded audio file and extracts the frame size information on each individual frame and the encoded audio data from the encoded audio file. A switch SW is placed on the output side of the encoded audio file analyzing portion 23. The switch SW can switch between the fast-forwarding and rewinding reproduction frame position information generating portion 24 and the encoded audio decoding portion 25.

The fast-forwarding and rewinding reproduction frame position information generating portion 24 generates a fast-forwarding and rewinding reproduction frame position information table from the frame size information on each of the frames and stores it the memory unit 26. The fast-forwarding and rewinding reproduction frame position information generating portion 24 is one form of the table generating portion. To describe it in detail, the fast-forwarding and rewinding reproduction frame position information table is generated as follows.

Figure 15:
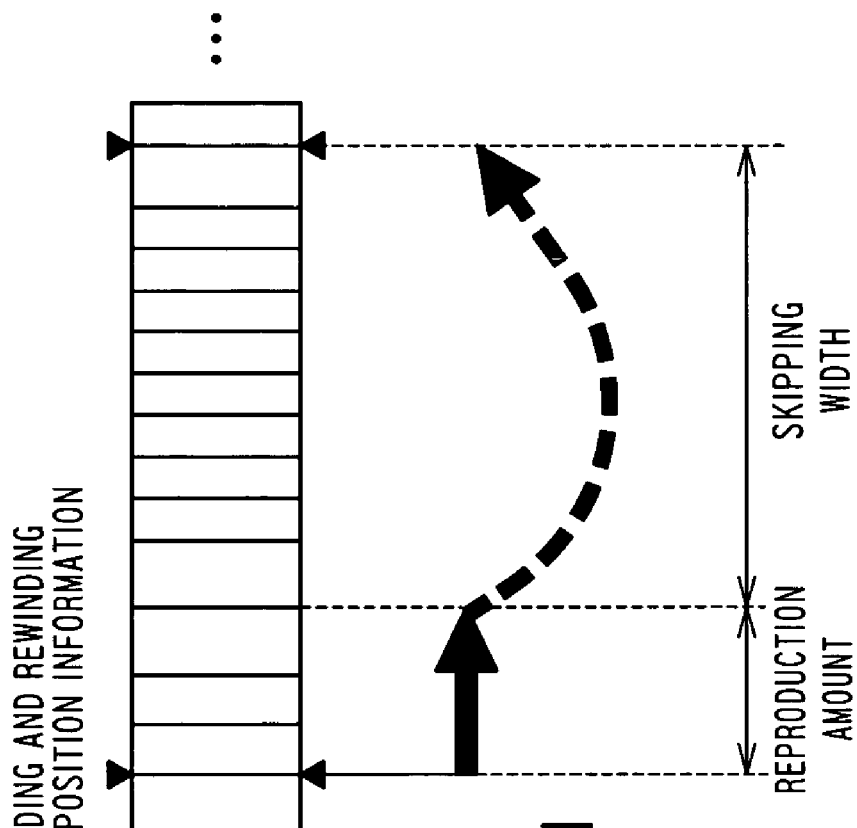
FIG. 15 is a diagram showing a relation between a reproduction amount and a magnification and a skipping width on the fast-forwarding and rewinding reproduction.

FIG. 15 is a diagram showing a relation between the reproduction amount and magnification and the skipping width on the fast-forwarding and rewinding reproduction.

Figure 16:
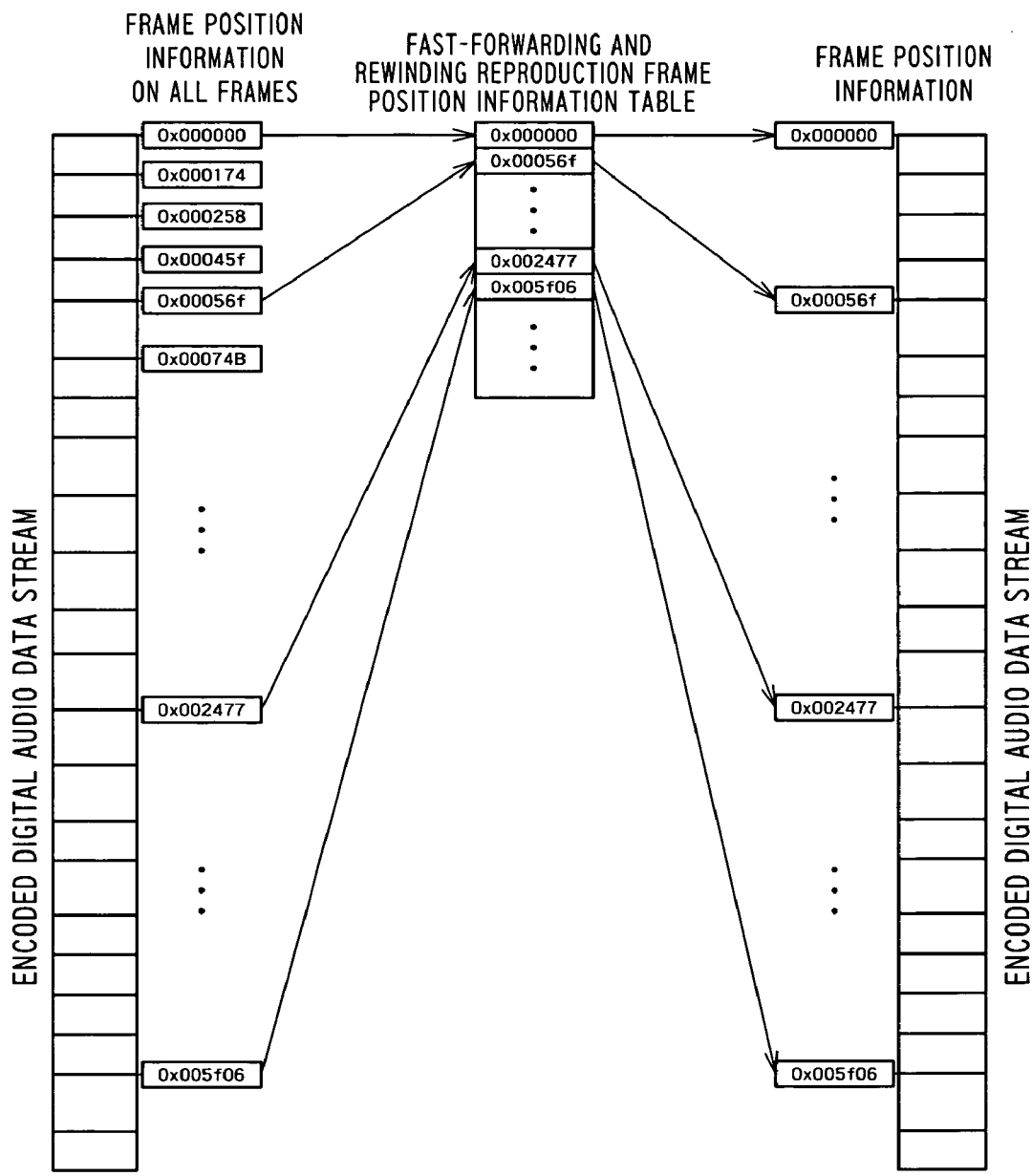
FIG. 16 is a diagram showing a picture of generating the fast-forwarding and rewinding reproduction frame position information table storing the position information on the frames at intervals of three frames.

It is defined as Magnification=(Reproduction Amount+ Skipping Width)/Reproduction Amount. The fast-forwarding and rewinding reproduction frame position information generating portion 24 acquires the skipping width based on the magnification and reproduction amount provided in advance and this formula, and generates the fast-forwarding and rewinding reproduction frame position information table storing the position information on the frame (reproduction start frame) per (reproduction amount+skipping width). FIG. 16 shows a picture of generating the fast-forwarding and rewinding reproduction frame position information table storing the position information on the reproduction start frame at intervals of three frames. In this example, it is Reproduction Amount=1 frame, Skipping Width=3 frames.

Figure 19:
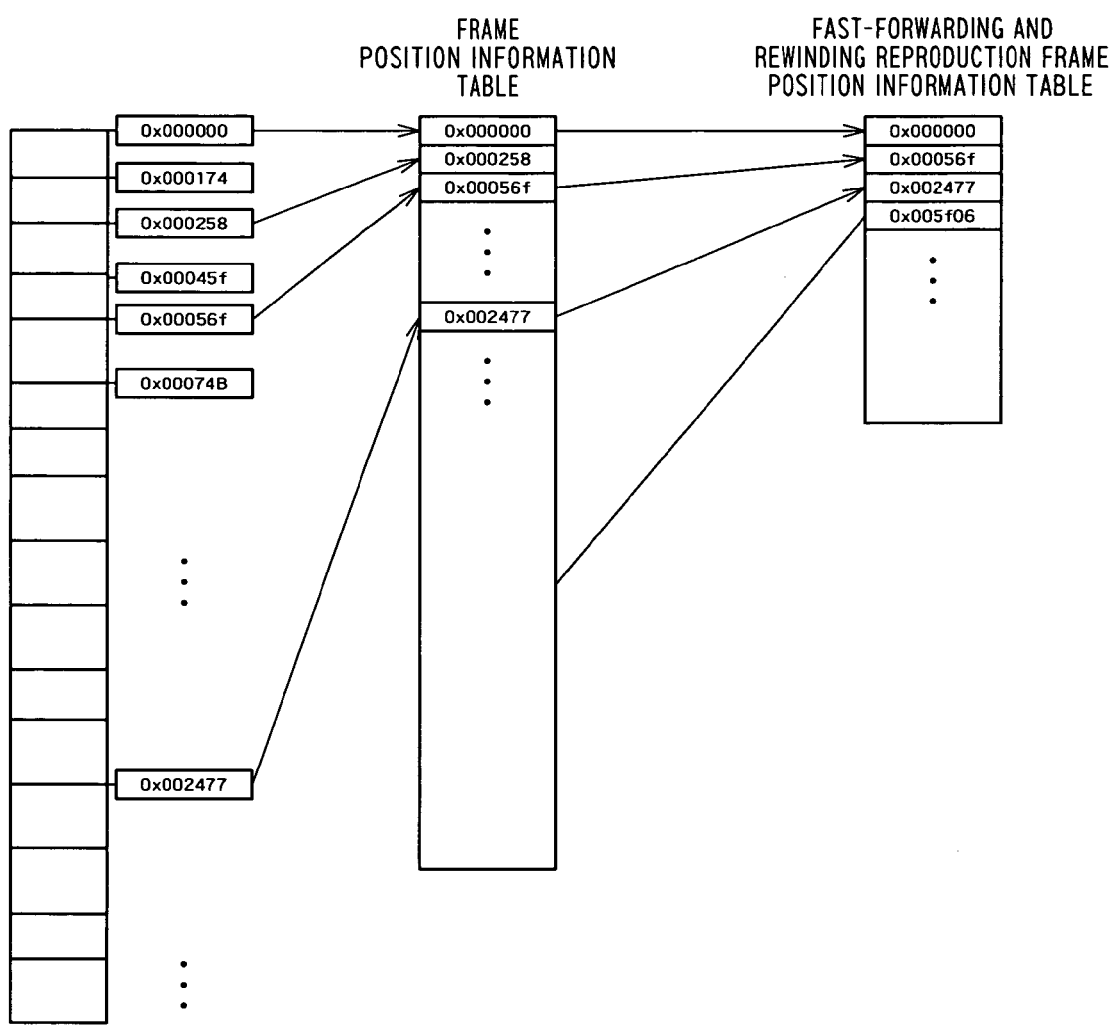
FIG. 19 is a diagram showing a picture of generating the fast-forwarding and rewinding reproduction frame position information table.

The fast-forwarding and rewinding reproduction frame position information table can also be generated as follows. To be more specific, the frame position information is selected according to the reproduction amount and magnification of the fast-forwarding and rewinding from the reproduction frame position information table generated in the first embodiment so as to generate the fast-forwarding and rewinding reproduction frame position information table. FIG. 19 shows a picture of this.

In the case where one of the reproduction amount and magnification is changed, the fast-forwarding and rewinding reproduction frame position information generating portion 24 regenerates the fast-forwarding and rewinding reproduction frame position information table based on the changed reproduction amount and magnification. It thereby allows the fast-forwarding and rewinding reproduction at arbitrary reproduction amount and skipping width.

After or during the generation of the fast-forwarding and rewinding reproduction frame position information table, the encoded audio decoding portion 25 receives the encoded audio data from the leading frame from the encoded audio file analyzing portion 23 and decodes it to output the digital audio data (decoded audio data), such as the PCM data. The encoded audio file analyzing portion 23 passes the frame in timing of an instruction from the encoded audio decoding portion 25.

The reproducing portion 28 performs the reproduction process by using the digital audio data outputted from the encoded audio decoding portion 25.

If a fast-forwarding and rewinding reproduction request from a first or halfway frame (reproduction start request frame) is inputted based on a user input or the like, the reproduction start position calculating portion 27 refers to the fast-forwarding and rewinding frame position information table and decides the frame to be read first as a reproduction start frame and sends the position information on the reproduction start frame (reproduction start position information) to the encoded audio decoding portion 25.

For instance, in the case where the fast-forwarding reproduction from the beginning of the encoded audio data or the rewinding reproduction from the end of the encoded audio data is requested, the reproduction start position calculating portion 27 decides the position information on the frame stored at the beginning or the end of the fast-forwarding and rewinding reproduction frame position information table as the reproduction start position information.

Figure 17:
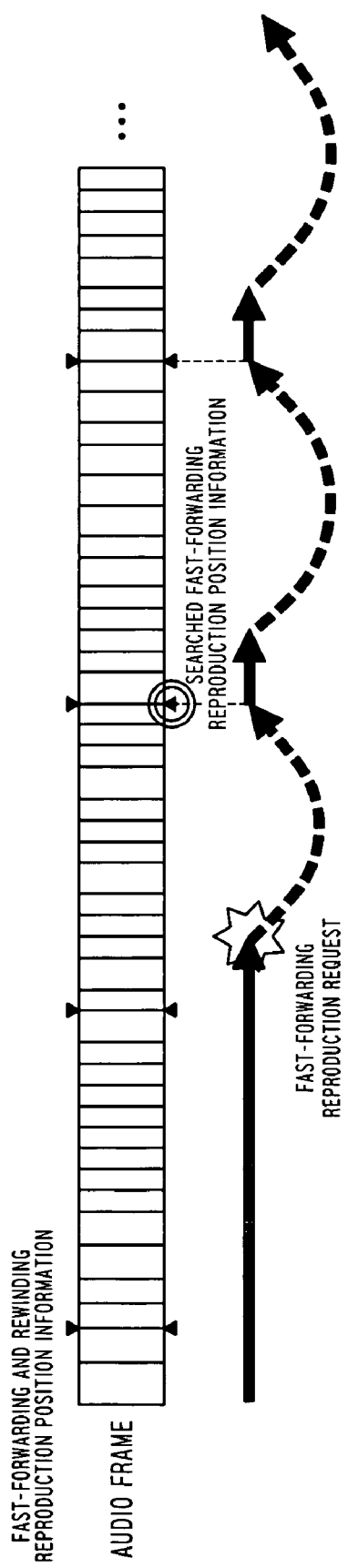
FIG. 17 is a diagram for describing an example of performing the fast-forwarding reproduction in the middle of encoded audio data.
Figure 18A:
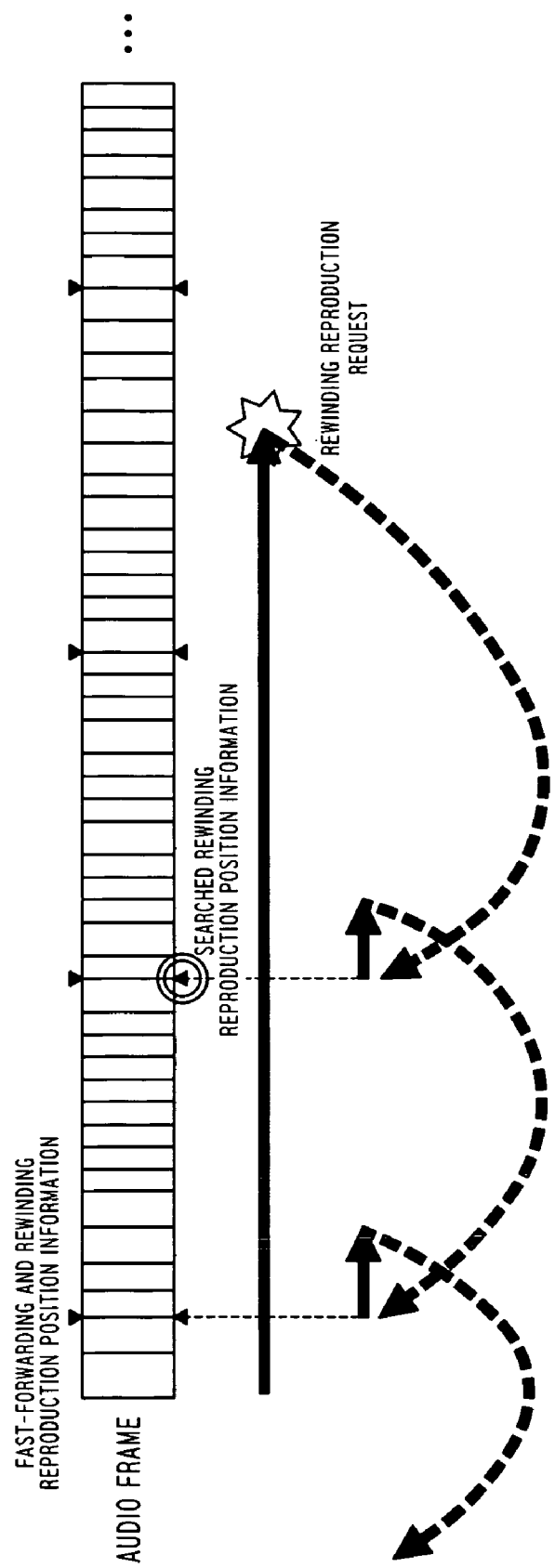
FIG. 18A is a diagram for describing an example of performing the rewinding reproduction in the middle of the encoded audio data.
Figure 18B:
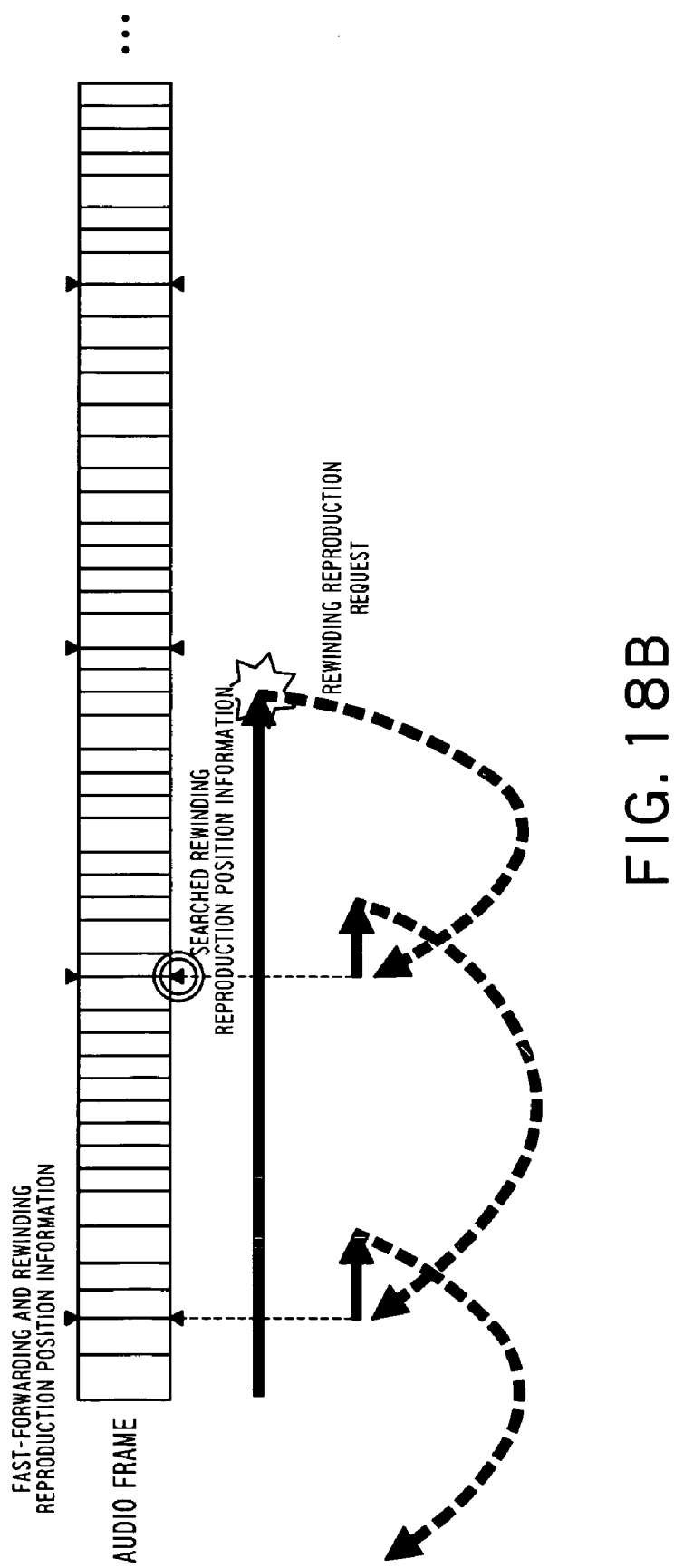
FIG. 18B is a diagram for describing an example of performing the rewinding reproduction in the middle of the encoded audio data.

In the case where a fast-forwarding reproduction request in the middle of the encoded audio data is inputted, the reproduction start position calculating portion 27 decides the position information on the frame immediately following the reproduction start request frame in the fast-forwarding and rewinding reproduction frame position information table as the reproduction start position information. FIG. 17 shows a picture of this. In the case of the rewinding reproduction in the middle of the encoded audio data, it decides, for instance, the position information on the frame further preceding the frame immediately preceding the reproduction start request frame by one place in the fast-forwarding and rewinding reproduction frame position information table as the reproduction start position information. FIG. 18A shows a picture of this. Or, in the case of the rewinding reproduction in the middle of the encoded audio data, it decides the position information on the frame immediately preceding the reproduction start request frame in the fast-forwarding and rewinding reproduction frame position information table as the reproduction start position information. FIG. 18B shows a picture of this. In a word, in the case of the rewinding reproduction in the middle of the encoded audio data, it decides the position information on the frame preceding the reproduction start request frame by a predetermined number of places in the fast-forwarding and rewinding reproduction frame position information table as the reproduction start position information.

The encoded audio decoding portion 25 requests the reading control portion 22 to read the encoded audio data of the reproduction amount from the frame indicated in the reproduction start position information. The reading control portion 22 reads the encoded audio data of the reproduction amount from the recording medium 21 and passes it to the encoded audio decoding portion 25 directly or via the encoded audio file analyzing portion 23. The encoded audio decoding portion 25 decodes the received encoded audio data and outputs the digital audio data to the reproducing portion 28. Thereafter, the reproduction start position calculating portion 27 notifies the encoded audio decoding portion 25 of the position information on the next (preceding in the case of fast-forwarding or following in the case of rewinding) frame stored in the fast-forwarding and rewinding reproduction frame position information table according to an instruction form the encoded audio decoding portion 25. The encoded audio decoding portion 25 requests the reading control portion 22 to read the encoded audio data of the reproduction amount from the frame indicated in the position information notified of. Thereafter, this is repeated to perform the fast-forwarding and rewinding reproduction based on the fast-forwarding and rewinding reproduction frame position information table (refer to FIG. 13).

In the case where a normal reproduction request is inputted during the fast-forwarding or rewinding reproduction, the fast-forwarding or rewinding reproduction is stopped and the encoded audio decoding portion 25 requests the reading control portion 22 to read the encoded audio data from the position at which the fast-forwarding or rewinding reproduction is stopped.

Third Embodiment

Figure 20:
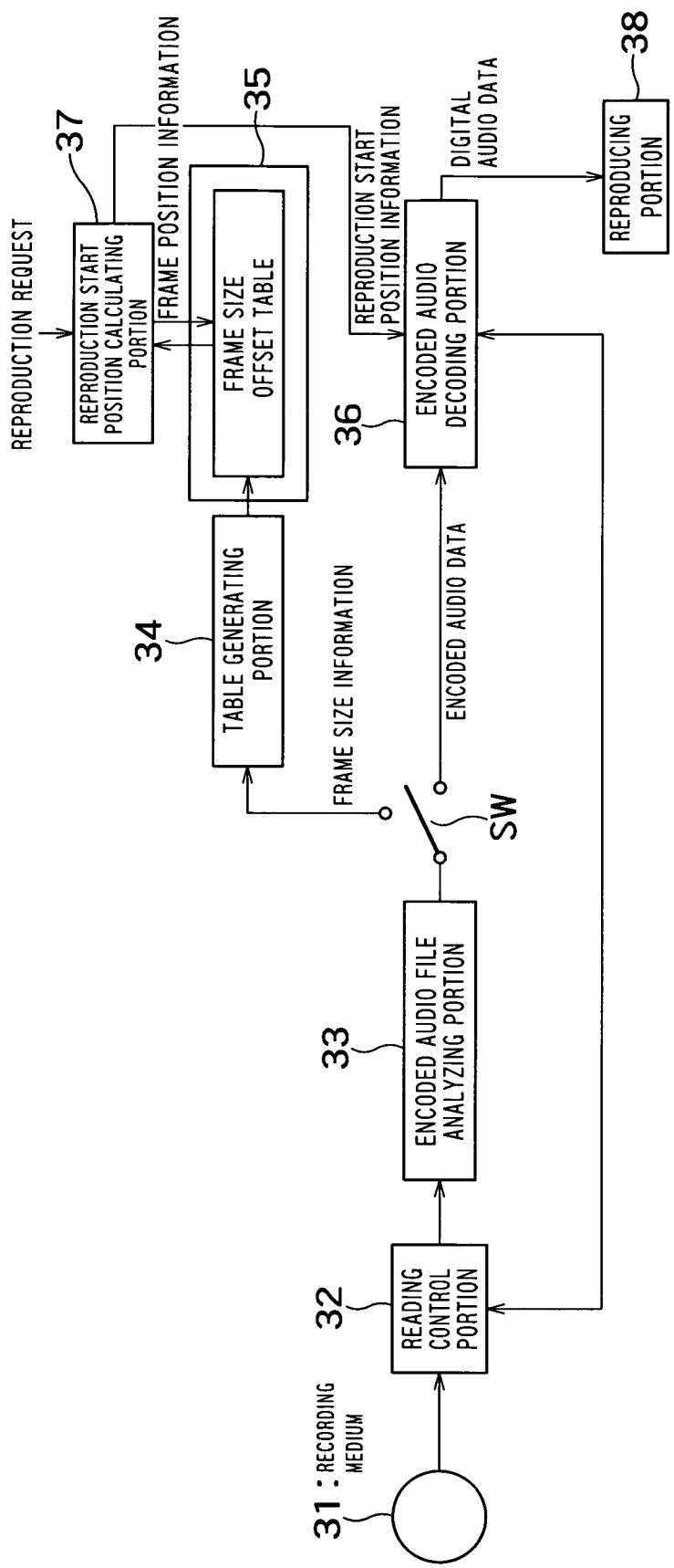
FIG. 20 is a block diagram schematically showing the configuration of the encoded digital audio reproducing apparatus according to a third embodiment of the present invention.

FIG. 20 is a block diagram schematically showing the configuration of the encoded digital audio reproducing apparatus according to a third embodiment of the present invention.

The reproducing apparatus includes a recording medium 31, a reading control portion 32, an encoded audio file analyzing portion 33, a table generating portion 34, a memory unit 35, an encoded audio decoding portion 36, a reproduction start position calculating portion 37 and a reproducing portion 38. Of these, the functions of all or a part of the reading control portion 32, encoded audio file analyzing portion 33, table generating portion 34, encoded audio decoding portion 36, reproduction start position calculating portion 37 and reproducing portion 38 may be either realized by having a program generated using an ordinary programming technique executed by a computer such as a CPU or realized hardware-wise.

The reading control portion 32 reads the encoded audio file from the recording medium 31 and passes it to the encoded audio file analyzing portion 33.

The encoded audio file analyzing portion 33 analyzes the encoded audio file received from the reading control portion 32 and extracts the audio data size, total number of frames and the frame size information on each individual frame from the encoded audio file and the encoded audio data from the encoded audio file.

The table generating portion 34 compresses the frame size information on each individual frame as described later based on the audio data size, total number of frames and the frame size information on each individual frame respectively. The table generating portion 34 generates a frame size offset table storing the compressed frame size information on each individual frame and stores it in the memory unit 35.

Figure 21:
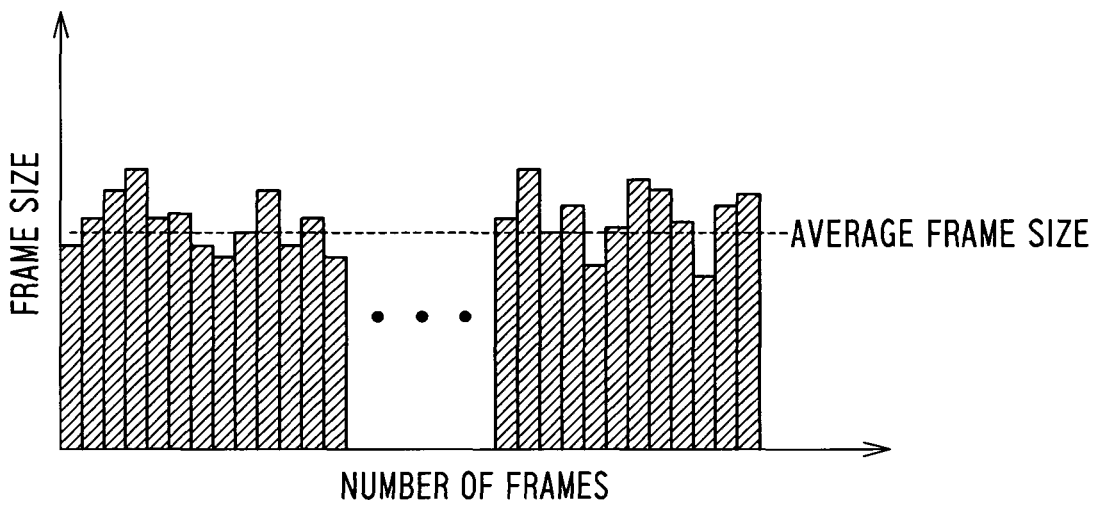
FIG. 21 is a diagram for describing a compression process of frame size information.
Figure 22:
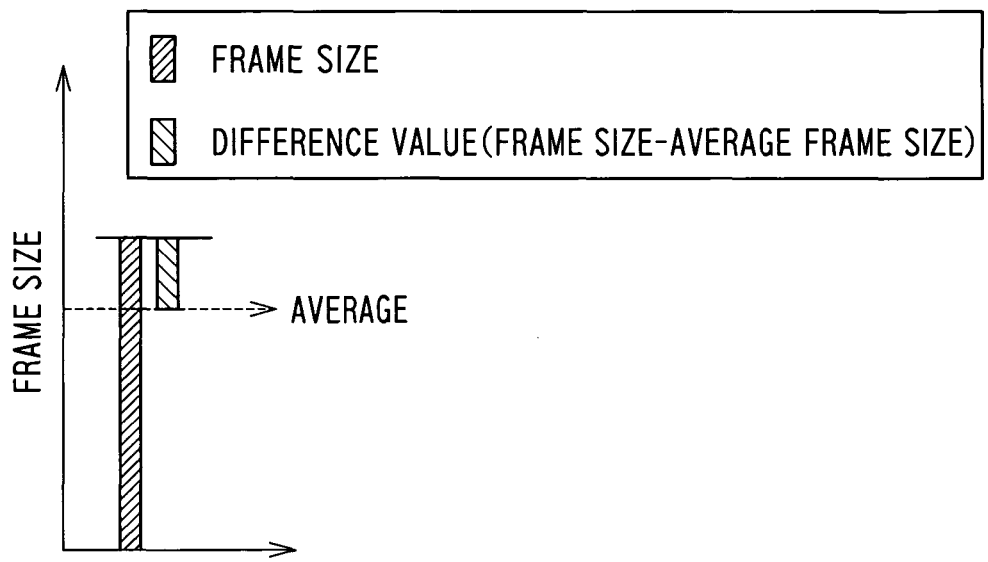
FIG. 22 is a diagram for describing the compression process of the frame size information.

FIGS. 21 and 22 are diagrams for describing a compression process of the frame size information by the table generating portion 34.

As shown in FIG. 21, the table generating portion 34 first acquires an average frame size based on the total number of frames and audio data size received from the encoded audio file analyzing portion 33. Next, it calculates a difference size between the size of each individual frame and the average frame size as shown in FIG. 22. And the table generating portion 34 stores the difference size calculated about each individual frame in the frame size offset table. Thus, it is possible, by holding the difference size between each individual frame and the average frame size, to render the data amount stored in the memory unit 35 smaller than that in the case of holding the frame size of each individual frame as-is.

For instance, there is an AAC stream of which audio data size 59652 bytes, total number of frames is 323 frames, and number of channels is 2ch. To acquire the average frame size of this stream, it is 59652/323=184 (bytes/frame). A maximum frame size of the AAC stream is given as 6144×2 (ch.)/8 (bits)=1536 (bytes), and a minimum frame size is given as 0. From the above, a range of the difference between the size of each individual frame and the average frame size is given as −184 to 1352. In the case where the frame sizes of the frames concentrate around the average frame size, it is possible to reduce the data amount stored in the memory unit 35 significantly by storing the difference size rather than storing the frame size of each individual frame as-is. Furthermore, the frame sizes of the frames do not vary so much under normal circumstances and are mostly around the average frame size. Therefore, it is possible to further reduce the data amount by encoding the difference size to a Huffman code.

In FIG. 20, after or during the generation of the frame size offset table, the encoded audio decoding portion 36 receives the encoded audio data from the leading frame from the encoded audio file analyzing portion 33 and decodes it so as to output the digital audio data (decoded audio data), such as the PCM data. The encoded audio file analyzing portion 33 passes the frame in timing of an instruction from the encoded audio decoding portion 35.

The reproducing portion 38 performs the reproduction process by using the digital audio data outputted from the encoded audio decoding portion 36.

In the case where the reproduction request from an arbitrary frame (reproduction start request frame) in the middle of the audio data such as the reproduction request from a k-th frame is inputted, the reproduction start position calculating portion 37 reads table values up to a $k-1^{st}$ frame in the frame size offset table (also decodes it if it is Huffman-encoded), sequentially adds the read data and calculates the sum of the result of addition and the average frame size×(k−1). Thus, the reproduction start position calculating portion 37 calculates the position of the k-th frame from the beginning of the encoded audio data (offset size) and passes the reproduction start position information indicating the calculated offset size (such as bytes) to the encoded audio decoding portion 36. It is also possible to add a header size of the encoded audio file to the offset size and pass it as the reproduction start position information to the encoded audio decoding portion 36.

The encoded audio decoding portion 36 requests the reading control portion 32 to read the encoded audio data from the position indicated in the reproduction start position information.

The reading control portion 32 reads the encoded audio data from the requested position from the recording medium 31 and sends it to the encoded audio decoding portion 36. The encoded audio decoding portion 36 decodes the encoded audio data and outputs the audio data to the reproducing portion 38. The reproducing portion 38 performs the reproduction process by using the audio data.

If a fast-forwarding or rewinding reproduction request is inputted, the reproduction start position calculating portion 37 calculates the discrete reproduction start positions by referring to the frame size offset table and passes it to the encoded audio decoding portion 36. The encoded audio decoding portion 36 requests the reading control portion 32 to read the encoded audio data of a predetermined reproduction amount sequentially from the reproduction start positions from the leading side. The reading control portion 32 reads the encoded audio data from the recording medium 31 and passes it to the encoded audio decoding portion 36. The encoded audio decoding portion 36 decodes the encoded audio data received from the reading control portion 32 and outputs the digital audio data. Thus, the reproduction is performed from the discrete positions at a fixed or arbitrary frame width (reproduction amount+skipping width).

The contents described above (referred to as a first example) have a fault that the amount of calculation increases because the addition of the different size is performed each time the reproduction request or the fast-forwarding reproduction or rewinding reproduction request is inputted. The following will describe an example capable of further reducing the amount of calculation (referred to as a second example).

Figure 23:
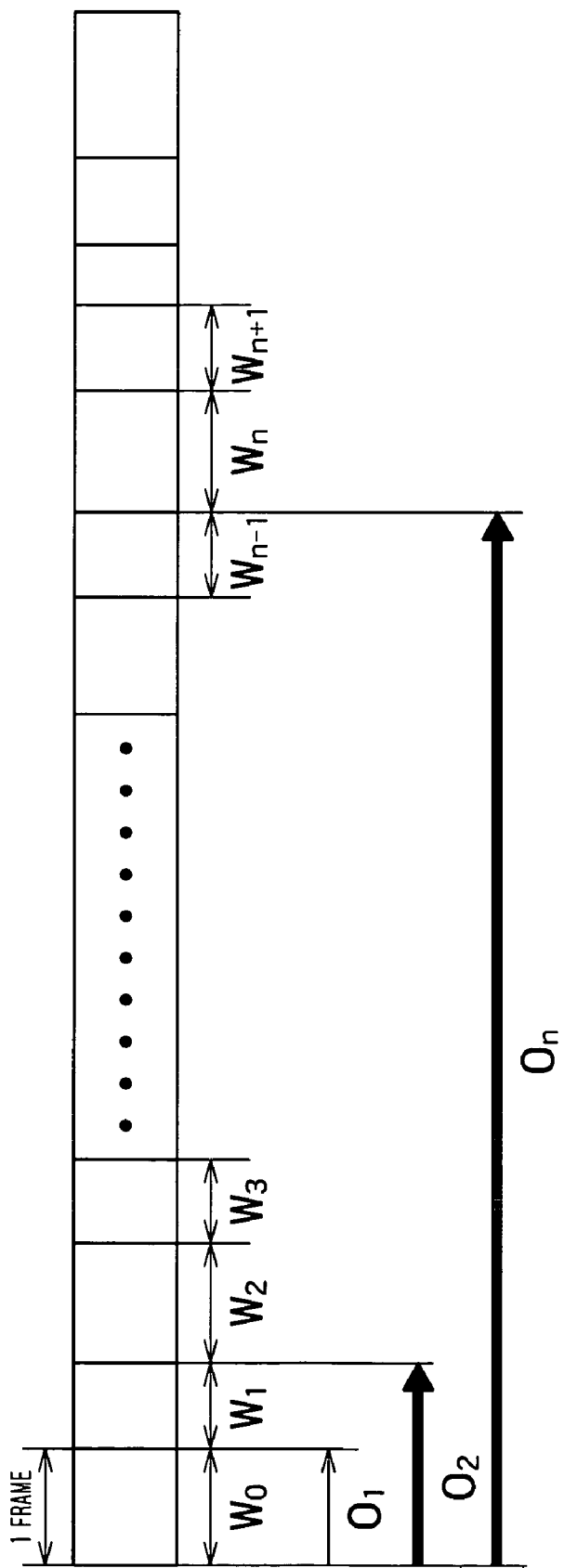
FIG. 23 is a diagram for describing a relation between a frame size and an offset size.

FIG. 23 shows the encoded audio data configured by frames Wx (x=1, 2, 3, . . . ).

Figure 24:
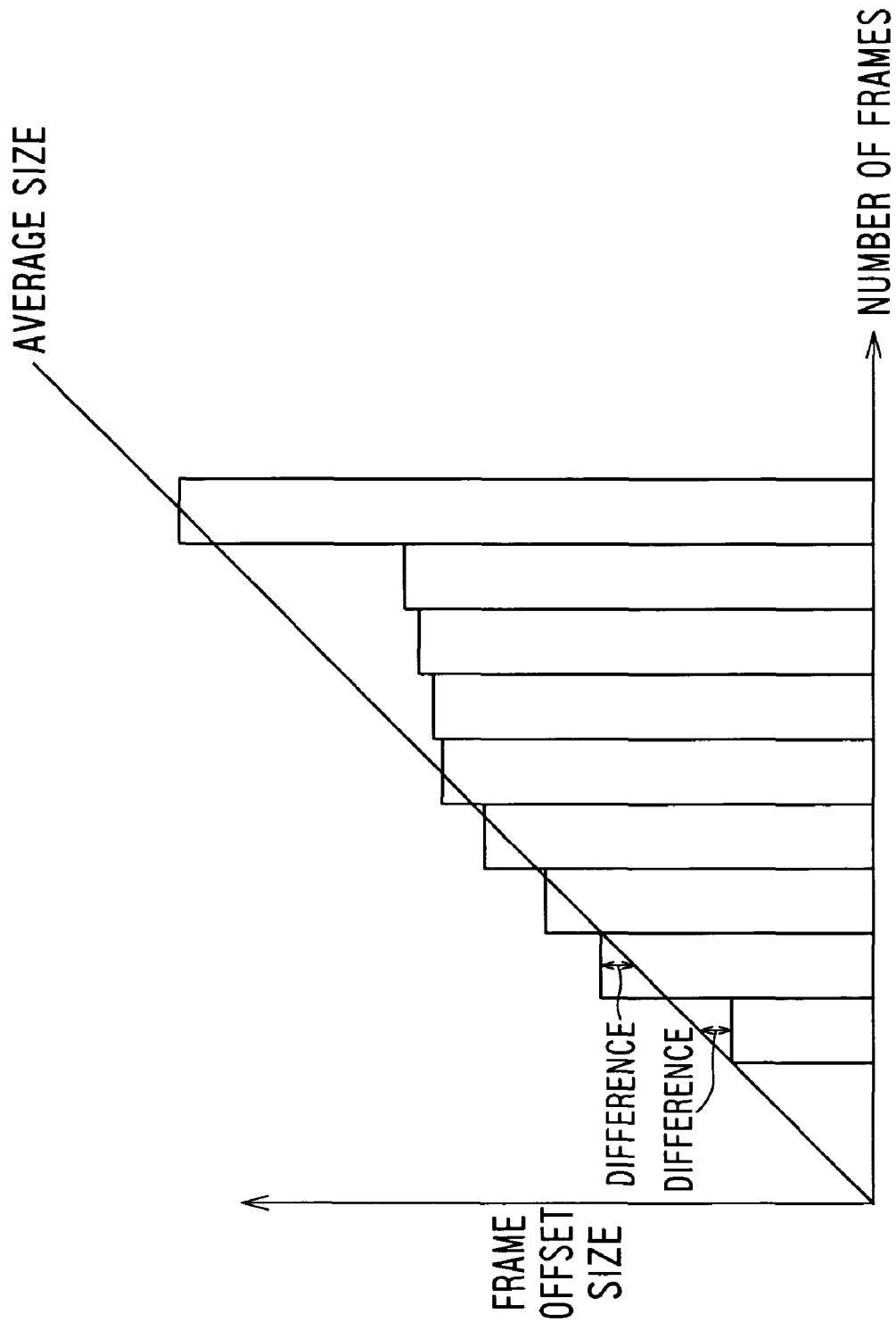
FIG. 24 is a diagram for describing a relation between the number of frames and a frame offset size.

The table generating portion adds the sizes of the frames Wx (x=1, 2, 3, . . . ) sequentially and thereby calculates the offset sizes of the frames Ox (x=1, 2, 3, . . . ) respectively. And it calculates the difference size between each individual offset size and (the average frame size×number of frames N (N=1, 2, 3, . . . )) so as to save each of the calculated difference sizes in the table correspondingly to each individual frame. FIG. 24 shows a picture of this. The difference size may be Huffman-encoded as in the first example.

In the case of performing the reproduction, fast-forwarding reproduction or rewinding reproduction in the middle of the encoded audio data, the difference size corresponding to an intended frame is detected from the table, and the offset size is calculated by the detected difference size+{average frame size×number of frames (number of frames from the leading frame to the frame immediately preceding the reproduction start frame)}. Therefore, the second example can reduce the amount of calculation compared to the first example, and is especially effective in the case of repeatedly performing the reproduction in the middle of the encoded audio data, such as the cases of the fast-forwarding and rewinding.

In the first and second examples described above, the difference size in each of the examples is held as to each of all the frames in the encoded audio data. In the case where there is no need to record the difference size as to each of all the frames, however, it is also possible to calculate and hold the difference size at intervals of the number of frames N. This will be described in detail below.

Figure 25:
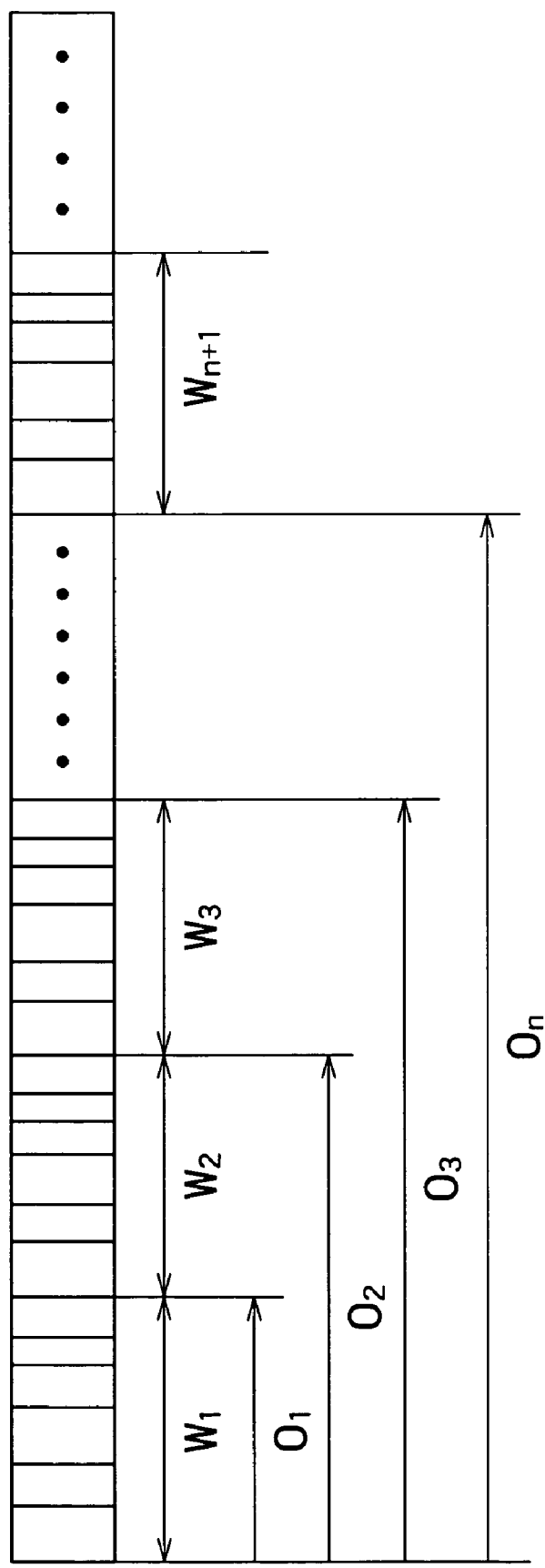
FIG. 25 is a diagram showing an example of acquiring a difference size at intervals of the number of frames 6.

FIG. 25 is a diagram for describing the examples of acquiring the difference size at intervals of the number of frames N=6 (third and fourth examples).

First, the total of the data sizes of six frames Wx (x=1, 2, 3, . . . ) is calculated at intervals of the number of frames N=6. The average frame size of all the frames is also calculated.

Thereafter, the difference size between each of the calculated total of the data sizes Wx (x=1, 2, 3, . . . ) and the average frame size×6 is calculated and held (third example). The difference size may be Huffman-encoded as in the first and second examples.

Or else, the offset sizes Ox (x=1, 2, 3, . . . ) from the beginning of the encoded audio data are calculated at intervals of the number of frames N=6. The difference size between each of the calculated offset sizes and the average frame size×N (N=6, 12, 18) is calculated and held (fourth example). The difference size may be Huffman-encoded as in the first to third examples.

As described above, it is possible to further reduce the data amount by holding the difference size at intervals of the predetermined number of frames.

What is claimed is:

1. An encoded digital audio reproducing apparatus comprising:

a reading control portion which reads from a recording medium an encoded audio file having a data part including audio data as a sequence of frames and a size part including size information on each of the frames;

a table generating portion which receives the size information on the frames from the reading control portion and generates a table holding positional information on frames at intervals of a predetermined number of frames in the sequence of frames based on the size information on the frames in the sequence of frames;

a decoding portion which receives the audio data from the reading control portion and sequentially decodes the audio data from a leading frame to output the decoded audio data;

a reproducing portion which reproduces the decoded audio data; and a reproduction start position calculating portion which, in the case where a reproduction request from an arbitrary frame in the audio data is inputted, decides from the table a frame satisfying a positional reference for the arbitrary frame as a reproduction start frame, wherein the decoding portion requests the reading control portion to read frames from the reproduction start frame from the recording medium, and wherein, the table generating portion generates a table in which, in a predetermined range from the arbitrary frame in the sequence of frames, intervals between frames whose positional information should be held are smaller than that not in the predetermined range.

2. An encoded digital audio reproducing apparatus comprising:

a reading control portion which reads from a recording medium an encoded audio file having a data part including audio data as a sequence of frames and a size part including size information on each of the frames;

a table generating portion which receives the size information on each of the frames, or a size of the audio data and a number of the frames, from the reading control portion, calculates an average frame size, calculates a difference size between the size of each of the frames and the average frame size, and generates a table holding the difference size calculated as to each of the frames;

a decoding portion which receives the audio data from the reading control portion and sequentially decodes the audio data from a leading frame to output the decoded audio data;

a reproducing portion which reproduces the decoded audio data; and a reproduction start position calculating portion which, in the case where a reproduction request from an arbitrary frame in the audio data is inputted, reads from the table the difference size of each of frames from the leading frame in the audio data to the frame immediately preceding the arbitrary frame, totals the read difference sizes, multiplies the average frame size by the number of frames whose difference sizes are read, and adds a total of the difference sizes to a result of the multiplication so as to decide a reproduction start frame for starting reproduction, wherein the decoding portion requests the reading control portion to read frames from the reproduction start frame from the recording medium.

3. The encoded digital audio reproducing apparatus according to claim 2, wherein:

the table generating portion encodes the difference size calculated as to each of the frames to a Huffman code and generates a table holding the Huffman-encoded difference sizes as the table; and in the case where the reproduction request from the arbitrary frame is inputted, the reproduction start position calculating portion reads from the table the Huffman-encoded difference size of each of frames from the leading frame in the audio data to the frame immediately preceding the arbitrary frame, and decodes the read Huffman-encoded difference sizes.

4. An encoded digital audio reproducing apparatus comprising:

a reading control portion which reads from a recording medium an encoded audio file having a data part including audio data as a sequence of frames and a size part including size information on each of the frames;

a table generating portion which receives the size information on each of the frames, or a size of the audio data and a number of the frames, from the reading control portion, calculates an average frame size, calculates as to each of the frames an offset size that is a total size from a leading frame to a immediately preceding frame, calculates as to each of the frames a difference size between a result of multiplying the number of frames from the leading frame to the immediately preceding frame by the average frame size and the offset size corresponding the frame, and generates a table holding the difference size calculated as to each of the frames;

a decoding portion which receives the audio data from the reading control portion and sequentially decodes the audio data from the leading frame to output the decoded audio data;

a reproducing portion which reproduces the decoded audio data; and a reproduction start position calculating portion which, in the case where a reproduction request from an arbitrary frame in the audio data is inputted, detects the difference size corresponding to the arbitrary frame from the table, and totals a result of multiplying the number of frames from the leading frame to a frame immediately preceding the arbitrary frame by the average frame size and the detected difference size so as to decide a reproduction start frame for starting reproduction, wherein the decoding portion requests the reading control portion to read frames from the reproduction start frame from the recording medium.

5. The encoded digital audio reproducing apparatus according to claim 4, wherein:

the table generating portion encodes the difference size calculated as to each of the frames to a Huffman code and generates a table holding the Huffman-encoded difference sizes as the table; and in the case where the reproduction request from the arbitrary frame is inputted, the reproduction start position calculating portion reads the Huffman-encoded difference size corresponding to the arbitrary frame from the table and decodes the read Huffman-encoded difference size.

* * * * *